(12) United States Patent
Szafraniec

(10) Patent No.: US 8,699,107 B2
(45) Date of Patent: Apr. 15, 2014

(54) HIGH DENSITY INK-JET PRINTING ON A TRANSPARENCY IN A CIELAB COLORSPACE

(75) Inventor: John D. Szafraniec, Bloomington, MN (US)

(73) Assignee: Carestream Health, Inc., Rochester, NY (US)

( * ) Notice: Subject to any disclaimer, the term of this patent is extended or adjusted under 35 U.S.C. 154(b) by 240 days.

(21) Appl. No.: 13/276,401

(22) Filed: Oct. 19, 2011

(65) Prior Publication Data

US 2012/0127491 A1    May 24, 2012

Related U.S. Application Data

(63) Continuation-in-part of application No. 13/117,444, filed on May 27, 2011.

(60) Provisional application No. 61/416,558, filed on Nov. 23, 2010.

(51) Int. Cl.
| | | |
|---|---|---|
| *H04N 1/50* | (2006.01) | |
| *H04N 1/60* | (2006.01) | |
| *G06K 15/02* | (2006.01) | |
| *B41J 3/407* | (2006.01) | |
| *B41J 2/21* | (2006.01) | |
| *H04N 1/23* | (2006.01) | |
| *G06K 15/10* | (2006.01) | |

(52) U.S. Cl.
CPC ........... *H04N 1/6019* (2013.01); *H04N 1/6027* (2013.01); *H04N 1/6097* (2013.01); *H04N 1/2323* (2013.01); *G06K 15/1868* (2013.01); *G06K 15/1878* (2013.01); *G06K 15/102* (2013.01); *B41J 3/407* (2013.01); *B41J 2/21* (2013.01)
USPC ........................... 358/521; 358/523; 358/502

(58) Field of Classification Search
USPC ........ 358/1.9, 3.24, 3.27, 502, 518–523, 530, 358/3.21, 3.23; 428/32.13–32.15; 347/5, 6, 347/14–16, 101, 103, 105, 106
See application file for complete search history.

(56) References Cited

U.S. PATENT DOCUMENTS

| | | | | |
|---|---|---|---|---|
| 4,943,813 A | * | 7/1990 | Palmer et al. | 347/105 |
| 5,686,953 A | | 11/1997 | Langmade et al. | |

(Continued)

FOREIGN PATENT DOCUMENTS

| | | | | |
|---|---|---|---|---|
| EP | 0 542 012 | | 5/1993 | |
| JP | 2011073307 A | * | 4/2011 | B41J 2/21 |

OTHER PUBLICATIONS

International Search Report, completed Jan. 13, 2012 for International Application No. PCT/US2011/055559, 3 pages.

(Continued)

*Primary Examiner* — Scott A Rogers

(57) ABSTRACT

A method of printing a high density image on a transparent medium. In some examples, the method includes calculating an expected optical density for an input pixel value, using a first function configured to output an optical density which produces a substantially linear relationship between the input pixel value and the output optical density as substantially perceived by a human eye. The method may also include calculating an L* value which represent a parameter in a CIELAB colorspace using the expected optical density. In some examples, the method includes calculating a response function that describes the relationship between L* and an output pixel value, the output pixel value specifying the amount of ink to deposit onto the transparent medium. In other examples, the method includes using the response function to solve for an output pixel value for the L* value; and creating a look up table.

18 Claims, 27 Drawing Sheets

(56) References Cited

U.S. PATENT DOCUMENTS

| | | |
|---|---|---|
| 5,754,697 A | 5/1998 | Fu et al. |
| 6,084,689 A | 7/2000 | Mo |
| 6,201,890 B1 | 3/2001 | Shi et al. |
| 6,247,860 B1 | 6/2001 | Yanagisawa |
| 6,424,730 B1 | 7/2002 | Wang et al. |
| 6,439,683 B1 | 8/2002 | Matsumoto et al. |
| 6,834,926 B2 | 12/2004 | Shibata |
| 2002/0067519 A1* | 6/2002 | Suzuki et al. ............... 358/519 |
| 2008/0130023 A1* | 6/2008 | Perez et al. ............... 358/1.9 |
| 2009/0009778 A1 | 1/2009 | Wen |
| 2010/0245871 A1 | 9/2010 | Tokunaga et al. |
| 2011/0310420 A1 | 12/2011 | Ikeda |
| 2013/0076825 A1* | 3/2013 | Szafraniec ............... 347/15 |

OTHER PUBLICATIONS

Text Book—Dr. R.W.G. Hunt, The Reproduction of Colour, $5^{th}$ Edition, Fountain Press, England, ISBN: 0 86343 381 2, 1958, Chapter 7 (pp. 107-135), Chapter 8 (pp. 136-176).

Commonly assigned U.S. Appl. No. 13/176,788, entitled: Transparent Ink-Jet Recording Film, filed May 27, 2011, by Simpson et al.

Commonly assigned U.S. Appl. No. 13/117,214, entitled: Transparent Ink-Jet Recording Film, filed May 27, 2011, by Simpson et al.

* cited by examiner

Fig. 13 - Example 1

Fig. 14 - Example 2

Fig. 15 - Example 3

US 8,699,107 B2

HIGH DENSITY INK-JET PRINTING ON A TRANSPARENCY IN A CIELAB COLORSPACE

CROSS REFERENCE TO RELATED APPLICATIONS

This patent application is a Continuation-in-Part of U.S. Ser. No. 13/117,444 entitled "HIGH DENSITY INK-JET PRINTING ON A TRANSPARENCY," filed on May 27, 2011 to Szafraniec, which claimed priority to U.S. Ser. No. 61/416,558 entitled "HIGH DENSITY INK-JET PRINTING ON TRANSPARENCY", filed on Nov. 23, 2010 to Szafraniec, both of which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Carestream, Inc., All Rights Reserved.

FIELD OF THE INVENTION

This invention relates generally to the field of ink-jet printing, and in particular to high density ink-jet printing on a transparent medium.

BACKGROUND

In a typical ink-jet printing system, ink droplets are ejected from a nozzle at high speed towards a recording medium (e.g., film) to produce an image on the recording medium. An image processing system can convert pixel values of an image into an ink output value for a printer. The ink output values comprise the raw values used by the printer as a command corresponding to the quantity of ink droplets to eject at a given point on the recording medium. Ideally, the printer will output a quantity of ink in the area on the recording medium corresponding to the pixel such that that area appears to an observer to have the color, tone, tint, shade, and optical density of the pixel in the image.

A given pixel value can correspond to multiple ink output values. For example, a pixel of a given color, tone, tint, shade, and optical density can be reproduced by the printer using a combination of multiple colors of ink. A typical ink-jet printer uses black, cyan, magenta, and yellow, although other and/or additional colors can be used. Accordingly, to reproduce a given pixel, the printer can output some portion of one or more of the ink colors available.

A transfer function can be used by the image processing system to convert the pixel value to the corresponding ink output values for each ink nozzle (e.g., each different color) on the printer. In some examples, the transfer function can take the form of a look up table (LUT) relating pixel values to the ink output values.

SUMMARY

Disclosed in an example is a method of printing a high density image on a transparent medium. In some examples, the method includes calculating an expected optical density for an input pixel value, using a first function configured to output an optical density which produces a substantially linear relationship between the input pixel value and the output optical density as substantially perceived by a human eye. In other examples, the method may also include calculating an L* value which represents a parameter in a CIELAB colorspace using the expected optical density. In some examples, the method may also include calculating a response function that describes the relationship between L* and an output pixel value, the output pixel value specifying the amount of ink to deposit onto the transparent medium. In yet other examples, the method may also include using the response function to solve for an output pixel value for the L* value; and creating a look up table based upon the input pixel value and the output pixel value, the look up table configured to be used in an inkjet printer.

These examples can be combined in any permutation or combination. This overview is intended to provide an overview of subject matter of the present patent application. It is not intended to provide an exclusive or exhaustive explanation of the invention. The detailed description is included to provide further information about the present patent application.

Figure 1:
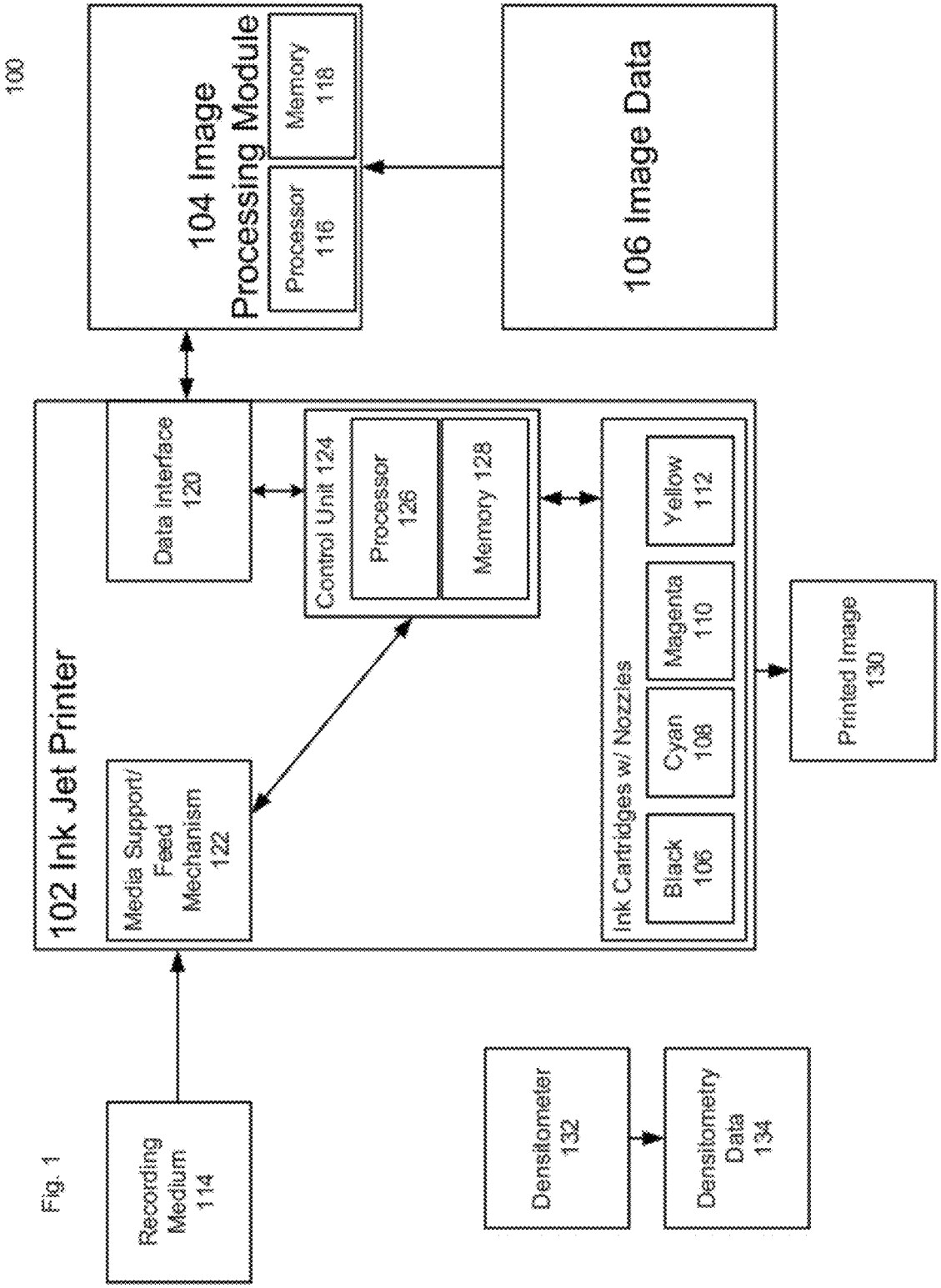
FIG. 1 shows a schematic of a printer according to one example of the present disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed is a system and method for printing high quality images on a transparent medium. The resulting image achieves near-linear perceived brightness in relation to image pixel value with high optical densities. This perceived brightness is the result of a look-up table or transfer function that correctly maps input image pixel values to ink output values.

FIG. 1 illustrates one example of a system 100 for printing on a transparent medium. The system 100 can include an ink-jet printer 102 and an image processing module 104 communicatively coupled to the ink jet printer 102. The image processing module 104 can be configured to convert pixel values from an image into ink output values for the printer 102. The ink-jet printer 102 can include a plurality of ink nozzles (106-112), each nozzle configured to output droplets of ink onto a recording medium (e.g., paper, transparency) 114. In an example, the printer 102 can include a first nozzle configured to output a black (K) ink 106, a second nozzle configured to output a cyan (C) ink 108, a third nozzle configured to output a magenta (M) ink 110, and a fourth nozzle configured to output a yellow (Y) ink 112. In other examples, the printer 102 can include additional nozzles for, for example, light black and dark black, light cyan and dark cyan, light magenta and dark magenta, and light yellow and dark yellow. In yet other examples, the printer 102 can include other nozzles and other colors.

The image processing module 104 can include a processor 116 and a memory device 118. In some examples, the image processing module 104 can be physically integral with the printer 102. In other examples, the image processing module can be implemented by another computing device (e.g., a general purpose computer) that is communicatively coupled to the printer 102. In yet other examples, the image processing module 104 can be partially implemented on another computing device and partially implemented on the printer 102. In any case, however, the image processing module can be communicatively coupled to the printer 102 through data interface 120 such that the ink output values from the image processing module 104 can be used by the printer 102 to command the nozzles to output a given quantity of ink at a given location. The data interface can be any method known to those skilled in the art including, but not limited to, a physical cable (e.g., a universal serial bus (USB) cable, serial cable, parallel or LPT cable) and a wireless medium (e.g., a Bluetooth, Wi-Fi, or cellular protocol).

Attached to or in proximity to the ink-jet printer 102 may be a mechanism 122 for supporting and making available media 114 to the ink jet printer 102. Such mechanisms may comprise, for example, trays, cassettes, feed slots, roller systems and the like.

The feed mechanism 122, data interface 120, and ink cartridges and nozzles 106-112 are communicatively coupled to control unit 124. Control unit has a processor 126 and memory 128 for receiving print jobs, and controlling media support feed mechanism 122, data interface 120 and ink cartridges w/nozzles 106-112 to produce printed image 130. In some examples, processor 116 and processor 126 can be the same or different processors. In some examples, memory 128 can be the same or different memory as memory 118.

In proximity to the ink-jet printer 102 may be a densitometer 132 that may be capable of reading transmittance and reflective densities of the printed image 130. In some embodiments, the densitometer 132 may be positioned at a distance from the printer 102. In other embodiments, the densitometer 132 may be incorporated into the printer 102 or, in some location in between. The densitometry data 134 may be transmitted to the Image Processing module 104 using a variety of known methods, such as, for example, standard or proprietary wired interfaces, or wireless connections, physical portable data devices such as CD, flash memory, manual input and the like. Additionally, the densitometry data 134 may optionally be transmitted through, for example, a local network, or optionally through one or more wide area networks and the like.

Figure 2:
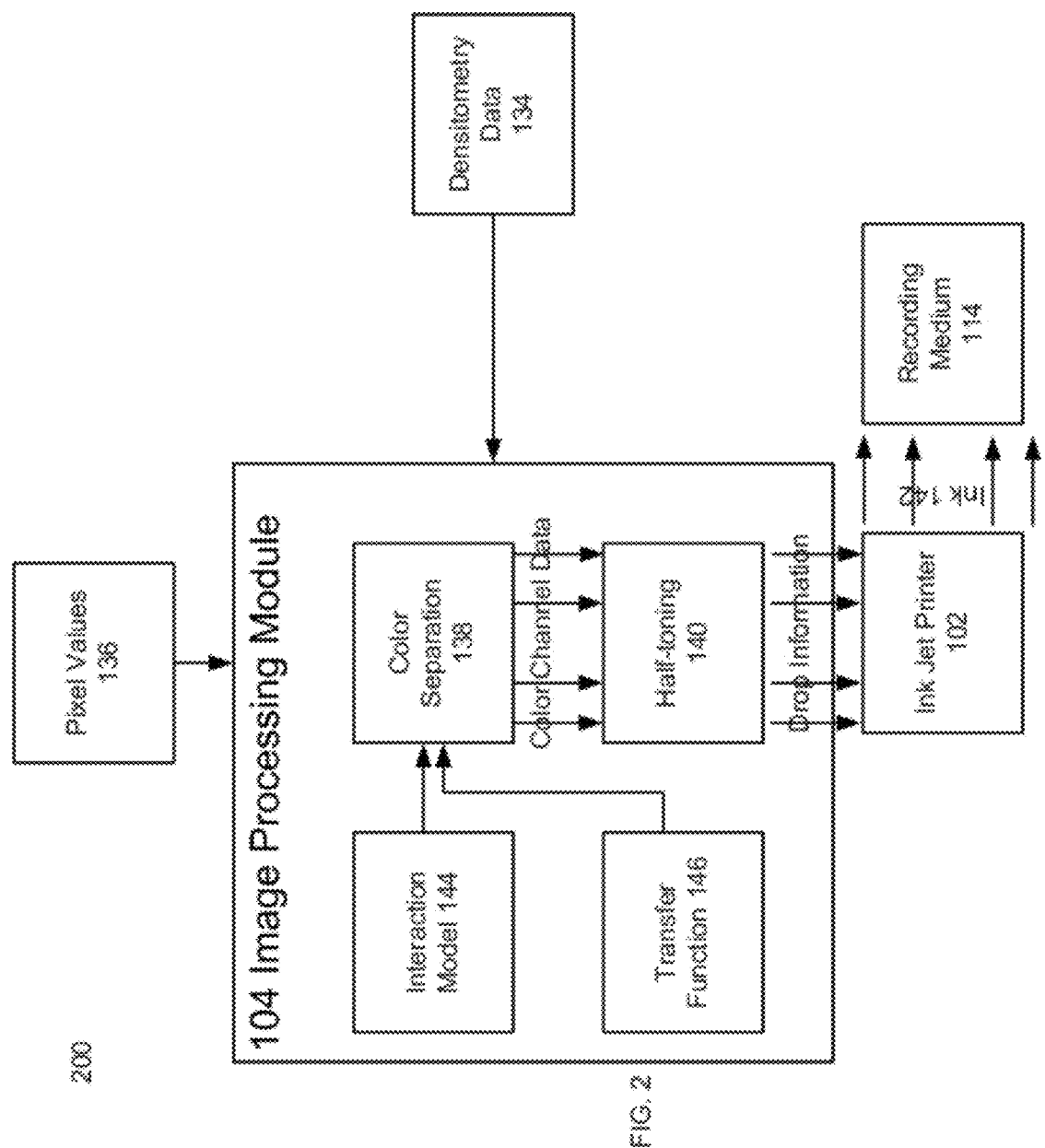
FIG. 2 shows another schematic of a image processing method according to another example of the present disclosure.

FIG. 2 illustrates a block diagram of an example method 200 where pixel values 136 are provided to the Image Processing module 104. The pixel values 136 may comprise digital image data. Such data may comprise data from an image data capture device or data from a variety of digital storage media. The pixel values 136 may comprise meta-data associated with the image. In some examples, pixel values 136 can be medical image data, including but not limited to x-ray images, magnetic resonance images (MRI), and computed tomography (CT) images. In examples where the image corresponding to the pixels includes a medical image, the pixel values may be communicated, for example, using the standard Digital Imaging and Communications in Medicine (DICOM) format. Other formats are possible, including JPEG, GIF, PNG, and the like. The densitometry data 134 is provided to the image processing module 104 where it might be used to comprise part of a model describing interactions between ink, output media and printer values.

The recording medium 114 may comprise an ink jet recording medium (e.g., a film). An ink-jet recording medium may comprise at least one image-receiving layer, which receives the ink 142 from the ink-jet printer 102 during printing. The recording medium 114 may also comprise a substrate or support, which may be opaque or transparent. An opaque support is used in films that may be viewed using light reflected by a reflective backing, while a transparent support is used in films that may be viewed using light transmitted through the film. In some examples found throughout this specification, the recording medium 114 can be the one described in U.S. Ser. No. 13/176,788 filed on Jul. 6, 2011 entitled TRANSPARENT INK-JET RECORDING FILM by Simpson, and U.S. Ser. No. 13/117,214 filed on May 27, 2011 entitled TRANSPARENT INK-JET RECORDING FILM by Simpson, both of which are incorporated herein by reference in their entirety, The image processing module 104 can prepare an image for printing, for example, by resizing the image (either larger or smaller). A resized image will have a different number of pixels than the original. If larger, more than 1 pixel in the resized image may represent a single initial pixel. If smaller, one pixel in the resized image may represent multiple pixels in the original image.

The image may then go though Color Separation 138 to be converted to a series of color separation images representing the different inks available such that the combination would closely replicate the color and/or tone scale of the image. The choice and ratio of inks 142 used to closely replicate the desired color and tone of the image may comprise the use of an interaction model 144 to describe the interactions between the one or more ink(s) 142 and the recording medium 114. As ink formulations vary by manufacturer, and each recording medium also varies by type and manufacturer, how an ink will look on a particular recording medium will vary. The interaction model 144 attempts to compensate for the differing media and ink formulations to produce a consistent image. Additionally the transfer function 146 may comprise the output response of the ink-jet printer 102 to different input pixel values. The transfer function 146 converts pixel intensities into ink densities. That is, the transfer function 146 maps the desired colors into an amount of ink of each color to place on the recording medium 114.

The image may then be converted to a half-tone image in order to achieve the dynamic range (light to dark) desired, Half-toning 140 is a technique that simulates continuous tone imagery through the use of dots, varying either in size, in shape, or in spacing and involves converting each image pixel to a pattern of ink droplets. Separate CMYK color dots are laid down in a close pattern such that from a normal viewing distance, it appears to be a continuous shade. The pattern of the ink droplets may be such that the combined droplets can closely reproduce the different colors and tonal levels desired. The pattern for the drops may be chosen based on the drop size of the particular printer and the drops per inch (dpi) desired.

This data may then be sent to the ink-jet printer 102, which may proceed to eject the specified ink-droplets from a nozzle towards media 114 comprising a recording film, element, or medium to produce an output image 130. Additional image processing algorithms, which are known in the art, may optionally be applied throughout the image processing 130. Those skilled in the art will recognize that the equivalent of such image processing module 104 can be constructed in many different combinations of software and hardware.

Based on the type of recording medium and inks used, image quality is dependent on both the interaction model 144 and the transfer function 146 to produce the desired output. What constitutes an acceptable image quality varies from application to application. In some examples, the output image is to be used in medical applications. In some examples, this medical imagery will be used by radiologists or other medical professionals in lieu of a traditional photographic x-ray. In these examples, images produced on the recording medium 114 will be viewed the same way traditional film-based x-rays are viewed—by the use of backlighting. In these examples, two factors are important: image quality (and in particular the absence of graininess), and optical density.

Optical density (OD) is the visually perceivable and measurable absorption of light on the surface of a medium due to the presence of a colorant. Optical density is important because a particular density of black is required for decent viewing through a backlight. If the density is not high enough, the image may appear gray and will be generally unacceptable. Optical density is a function of both the amount of ink laid down by the printer, as well as the particular combination of colors laid down. Thus for example, an inkjet printer does not strictly use black ink to produce a black tone, it uses additional CMY (cyan, magenta, yellow) colors as well. So to produce a black with a desired optical density, a combination of different colors can be used. For x-rays, the maximum density may be between 2.0 and 4.0 to be effectively viewed. Additionally, the density should be perceived to be linear when viewed on a lightbox. If the density is not linearly bright, detail in the image is lost.

Graininess is the property of a printed image not appearing continuously smooth, or of appearing composed of grains. Graininess is the result of the printer not printing enough drops of ink per inch. Graininess and optical density are related in that a given color of ink or combination of colors may give a desired optical density but be too grainy. The optimum combination of ink to produce a desired optical density at a desired tone or shade also uses enough ink to lay down enough dots to make the image look continuous and not grainy. As mentioned before, it is desirable for the image density to be linear as perceived. This is not as easy as it may sound as the relationship between the amounts of the one or more inks deposited on the recording medium and optical density on the recording medium is not linear and may not be the same between different ink(s) and different media. The present disclosure, in one example, is a system and method for determining the amount of one or more inks to apply to a recording medium in order to generate a linear scale in perceived optical density between a minimum density (Dmin) and a maximum density (Dmax), where Dmax is sufficiently high for an intended use. Such a method is useful to reproduce an accurate image on a given recording medium with one or more inks.

Relationship Between Optical Density and Pixel Value

Optical density (OD) is related to transmittance according to the following equation:

$$OD = -\gamma \cdot Log_{10} T.$$

Where T is the transmittance which is defined as the fraction of incident light at a specified wavelength that passes through a sample. Gamma, or $\gamma$, is used to quantify contrast and can be added to the standard OD formula as another parameter to increase equation fit with observed data. While the equation above uses transmittance T, a grayscale input image to the printer's transfer function utilizes values of between 0-255 representing the image brightness/darkness at a particular unit of the picture, called a pixel. In an example, for 256 bit levels (0-255) transmittance T can be expressed in terms of Pixel Value (or Bit Value) as shown in the following equation:

$$T = \frac{255 - PixelValue}{255}$$

In this example, transmittance is 1 (transparent) for a Pixel Value of 0, and transmittance is 0 (opaque) for a PixelValue of 255. A direct substitution of T into the Optical Density Equation would result in an Optical Density of 0 for a Pixel Value of 0 according to the following statement:

$$PixelValue = 0 \Rightarrow T = 1$$

$$T = 1 \Rightarrow OD = 0$$

However, as mentioned above, the transmittance properties of most recording mediums include some minimum density (Dmin). Therefore, the relationship may be rewritten to comprise the following substitution:

$$PixelValue = 0 \Rightarrow OD = D_{min}$$

With the changes above, the Optical Density may comprise the following relationship:

$$OD = -\gamma \cdot Log_{10}\left(\frac{255 - PixelValue}{255}\right) + D_{min}$$

Additionally, most printed optical densities do not achieve complete opacity. Therefore, for most recording mediums there may be a maximum density (Dmax) that can be achieved as expressed:

$$PixelValue = 255 \Rightarrow OD = D_{max}$$

Optical Density may be rewritten to account for Dmax as follows:

$$OD = -\gamma \cdot Log_{10}\left[1 + \frac{PixelValue}{255} \cdot \left(10^{-\frac{(D_{max} - D_{min})}{\gamma}} - 1\right)\right] + D_{min}$$

With the expression above you have the basic relationship between optical density (OD), Pixel Value, and gamma.

In an example, gamma, or contrast, from the above equation can be adjusted based on the recording medium. The selection of contrast, $\gamma$, comprises a significant influence on the final relationship between PixelValue, PV, and Optical Density.

For those occasions when $\gamma \gg 1$ (gamma is much greater than one) then:

$$\frac{D_{max} - D_{min}}{\gamma} \ln(10) \cong \frac{D_{max} - D_{min}}{\gamma}$$

Based on an approximation utilizing the Taylor series solution for $10^x$ which is:

$$10^x = 1 + x\ln(10) + \frac{(x\ln(10))^2}{2!} + \frac{(x\ln(10))^3}{3!} + \ldots$$

With an approximation:

$$10^{-\frac{(D_{max} - D_{min})}{\gamma}} \cong 1 - \frac{D_{max} - D_{min}}{\gamma}$$

Substituting this into the OD equation from before results in:

$$OD = -\gamma \cdot Log_{10}\left[1 + \frac{D_{min} - D_{max}}{255 \cdot \gamma} \cdot PixelValue\right] + D_{min}$$

Using the Maclaurin series relationship:

$$Log(1+x) = x - \tfrac{1}{2}x^2 + \tfrac{1}{3}x^3 - \tfrac{1}{4}x^4 + \ldots \text{ for } -1 < x \leq 1$$

Optical Density may be rewritten as:

$$\Rightarrow OD = -\gamma\left[\frac{D_{min} - D_{max}}{\gamma \cdot 255} \cdot PV - \right.$$
$$\left. \frac{1}{2}\left(\frac{D_{min} - D_{max}}{\gamma \cdot 255} \cdot PV\right)^2 + \frac{1}{3}\left(\frac{D_{min} - D_{max}}{\gamma \cdot 255} \cdot PV\right)^3 - \ldots\right] + D_{min}$$

where PV=Pixel Value.

Figure 3:
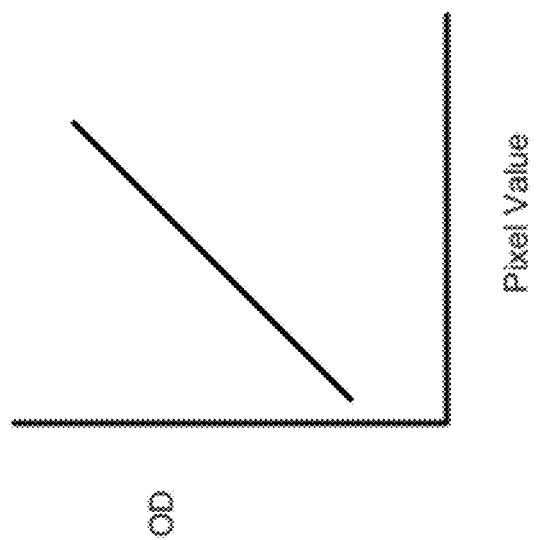
FIG. 3 shows a plot of optical density versus pixel value according to one example of the present disclosure.

Because gamma is much bigger than one, only the linear term is meaningful, so ignore all but the linear terms. After factoring out gamma, this results in a linear relationship between Optical Density and Pixel Value.

$$OD = \left[\frac{D_{max} - D_{min}}{255} \cdot PV\right] + D_{min} => \text{Linear Density}$$

which results in a line similar to that of FIG. 3.

This results in an actual linear brightness, but an image created with a transfer function created with this function would not appear linear to the human eye. The perceived brightness is brightness as perceived by an average human eye. This is because the human eye is better adapted at discerning differences in intensity between two bright shades rather than two dark shades. For the ideal medical image the image must look linear when viewed from the light box using a human eye. Therefore, what is desired is a linear perceived brightness, which requires greater increases in OD as the pixel value increases. Thus the change in OD from pixel value 0 to pixel value 1 is less than the change in OD from pixel value 254 to pixel value 255. Linear perceived brightness can be defined as increasing the change in optical density as pixel values grow darker.

Achieving a perceived linear brightness can be accomplished by changing gamma to 3 in the above equations, and results in a much closer linear perceived brightness. For γ=3, the above expression for optical density may then be rewritten to comprise the following:

$$OD = -3 \cdot \text{Log}_{10}\left[1 + \frac{PixelValue}{255} \cdot \left(10^{-\frac{(D_{max}-D_{min})}{3}} - 1\right)\right] + D_{min}$$

Figure 4:
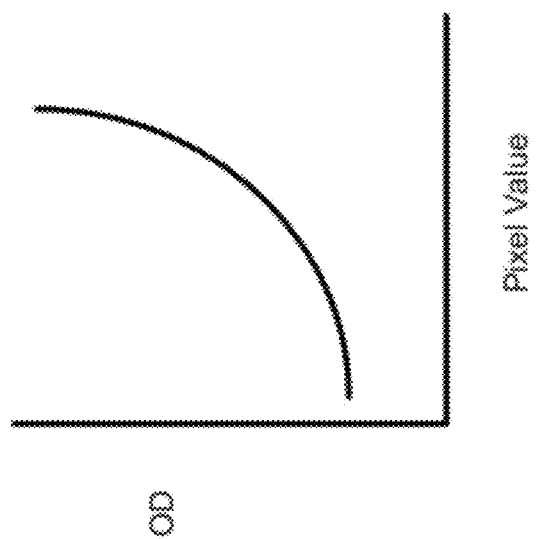
FIG. 4 shows a plot of optical density versus pixel value according to one example of the present disclosure.

This results in a OD vs. Pixel value curve approximately like that of FIG. 4. While this is not a direct linear relationship, it produces more of a predominately linear relationship between Pixel Value and perceived brightness.

Figure 5:
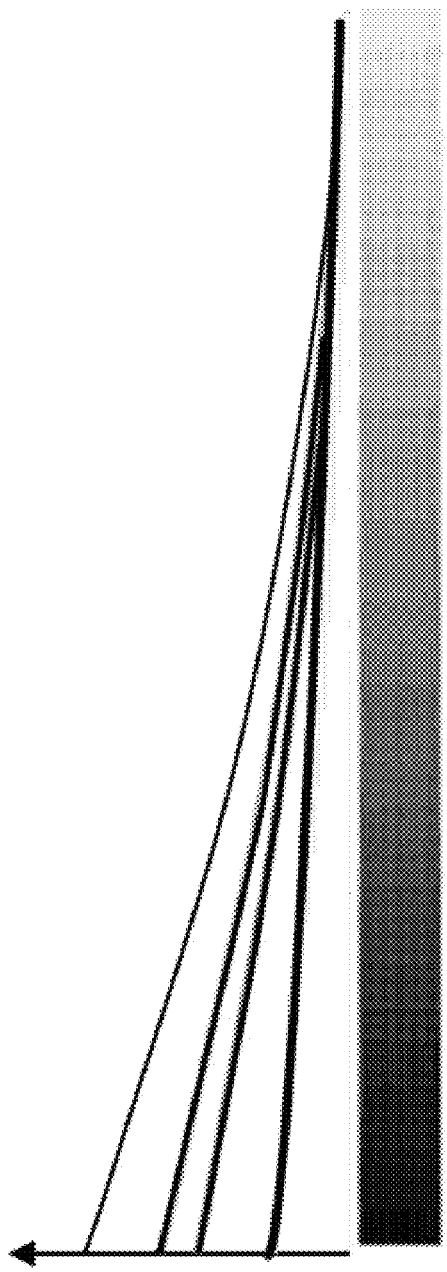
FIG. 5 shows a plot of K,C,M,Y values versus shading according to one example of the present disclosure.

The above equations dealt primarily with instances where optical density was calculated using only one component pixel value. However, grayscale images can be created by the printer using combinations of black and colored ink. Adding cyan, magenta, or yellow to black can be used to achieve greater optical densities than using black ink alone. An example of the ink combinations and the resulting black is shown in FIG. 5.

The desired optical density, $OD_T$, as a function of Pixel Value as shown in the above equations, may comprise the Optical Density, $OD_K$, of the black ink as a function of the Pixel Values of the Black ink in combination with the optical densities, $OD_C$, $OD_M$, $OD_Y$, produced by the other inks as function of their Pixel Values.

$$OD_T = OD_K + OD_{C,M,Y}$$

Using the earlier expressions for Optical Density equation results in the following equations for the black and cyan, magenta, and yellow ink:

$$OD_T = -\gamma_T \cdot \text{Log}_{10}\left[1 + \left(10^{-\frac{D_{Tmax}-D_{Tmin}}{\gamma_T}} - 1\right) \cdot \frac{PV}{255}\right] + D_{Tmin} \quad \text{Equation 1}$$

$$OD_K = -\gamma_K \cdot \text{Log}_{10}\left[1 + \left(10^{-\frac{D_{Kmax}-D_{Kmin}}{\gamma_K}} - 1\right) \cdot \frac{PV}{255}\right] + D_{Kmin} \quad \text{Equation 2}$$

$$OD_{C,M,Y} = -\gamma_{C,M,Y} \cdot \text{Log}_{10}\left[1 + \left(10^{-\frac{D_{C,M,Ymax}-D_{C,M,Ymin}}{\gamma_{C,M,Y}}} - 1\right) \cdot \frac{PV}{255}\right] + D_{C,M,Ymin} \quad \text{Equation 3}$$

If these are substituted into the earlier equation: $OD_T = OD_K + OD_{C,M,Y}$ and simplifying, there is derived a transcendental equation for gamma's $$\left[1 + \left(10^{-\frac{D_{Tmax}-D_{Tmin}}{\gamma_T}} - 1\right) \cdot \frac{PV}{255}\right]^{\gamma_T} = \left[1 + \left(10^{-\frac{D_{Kmax}-D_{Kmin}}{\gamma_K}} - 1\right) \cdot \frac{PV}{255}\right]^{\gamma_K} \cdot$$

$$\left[1 + \left(10^{-\frac{D_{C,M,Ymax}-D_{C,M,Ymin}}{\gamma_{C,M,Y}}} - 1\right) \cdot \frac{PV}{255}\right]^{\gamma_{C,M,Y}}$$

These equations are used to determine theoretical optical density from a given input pixel value based on a desired or observed maximum and minimum optical density that is specific to a given device and media and based on a desired gamma curve. The goal of a proper transfer function is to match this function as closely as possible. Therefore, this function is the benchmark for determining a good transfer function. One may compare the measured optical density created by their transfer function to the theoretical equations above to determine how closely the transfer function performs.

Determining the Appropriate Transfer Function

The theoretical relationship between input pixel values and optical density has been explored. Given a theoretical optical density for any given input pixel value, what is needed now is to map that to an output ink quantity. A transfer function does just this by mapping input pixel values to output ink values. Since each printer and media is different, this transfer function will partly be based upon measured observations.

In one example, to accomplish this, a 21 step calibration wedge is printed by passing to the printer the input pixel values as output ink values without modification. This wedge is then measured using a densitometer to determine the OD of the various printed pixel values. Based on these data points, a relationship function between input pixel values and the output optical density can be determined by interpolation or other known mathematical means.

In one example, the printer used includes an Epson Styles Pro 4900 and the transfer function includes an identity LUT (look up table) created using a RIP (e.g., Wasach, Epson's SDK Halftone). In an example the actual optical densities for the black (K) and the combination of the cyan, magenta, and yellow inks is determined based on the following functions as determined by observation of the 21 step wedge using a densitometer, working backwards to arrive at the functions:

$OD_K = 0.0000243 * \text{PixelValue}^2 + 0.002092 * \text{PixelValue} + 0.170$      Equation 4:

$0 < \text{PixelValue} < 255$ $OD_{C,M,Y} = 0.000022 * \text{PixelValue}^2 + 0.00426 * \text{PixelValue}$    Equation 5:

$0 < \text{PixelValue} < 102$

Additionally, the transfer function can be configured to generate the following minimum and maximum densities: @ $D_{Kmax}$ PV=255, and @ $D_{C,M,Ymax}$ PV=102, as determined by observation.

| $D_{Tmax}$ | $D_{Tmin}$ | $D_{Kmax}$ | $D_{Kmin}$ | $D_{C,M,Ymax}$ | $D_{C,M,Ymin}$ |
|---|---|---|---|---|---|
| 2.88 | .17 | 2.22 | .17 | .66 | 0 |

These values are based on experimentally derived data.

In an example, the transfer function converts the pixel values such that the image on the transparent recording medium is perceived by an observer as linear when viewed from a back lit box: hence $\gamma_T = 3$. In an example, if $\gamma_{C,M,Y}$ is set to the arbitrary value 0.5 it is possible to solve for $\gamma_K$ in the transcendental equation above.

| $\gamma_T$ | $\gamma_K$ | $\gamma_{C,M,Y}$ |
|---|---|---|
| 3 | 2.8 | .5 |

The following optical densities are calculated from the above theoretical equations, as shown in Table 1.

TABLE 1

| PixelValue | $OD_T$- Eqn. 1 | $OD_K$- Eqn. 2 | $OD_{C,M,Y}$ Eqn. 3 | $OD_K + OD_{C,M,Y}$ |
|---|---|---|---|---|
| 255 | 2.88 | 2.22 | 0.66 | 2.88 |
| 242 | 2.496 | 1.984 | 0.512 | 2.496 |
| 230 | 2.195 | 1.781 | 0.423 | 2.204 |
| 217 | 1.95 | 1.608 | 0.361 | 1.969 |
| 204 | 1.744 | 1.457 | 0.312 | 1.769 |
| 191 | 1.566 | 1.322 | 0.272 | 1.594 |
| 179 | 1.409 | 1.2 | 0.239 | 1.439 |
| 166 | 1.269 | 1.09 | 0.21 | 1.3 |
| 153 | 1.143 | 0.989 | 0.184 | 1.173 |
| 140 | 1.028 | 0.895 | 0.161 | 1.056 |
| 128 | 0.923 | 0.809 | 0.141 | 0.95 |
| 115 | 0.825 | 0.728 | 0.122 | 0.85 |
| 102 | 0.734 | 0.652 | 0.104 | 0.756 |
| 89 | 0.649 | 0.58 | 0.088 | 0.668 |
| 77 | 0.569 | 0.513 | 0.073 | 0.586 |
| 64 | 0.494 | 0.449 | 0.059 | 0.508 |
| 51 | 0.423 | 0.388 | 0.046 | 0.434 |
| 38 | 0.356 | 0.33 | 0.033 | 0.363 |
| 26 | 0.291 | 0.275 | 0.022 | 0.297 |
| 13 | 0.23 | 0.222 | 0.011 | 0.233 |
| 0 | 0.17 | 0.17 | 0 | 0.17 |

Figure 6:
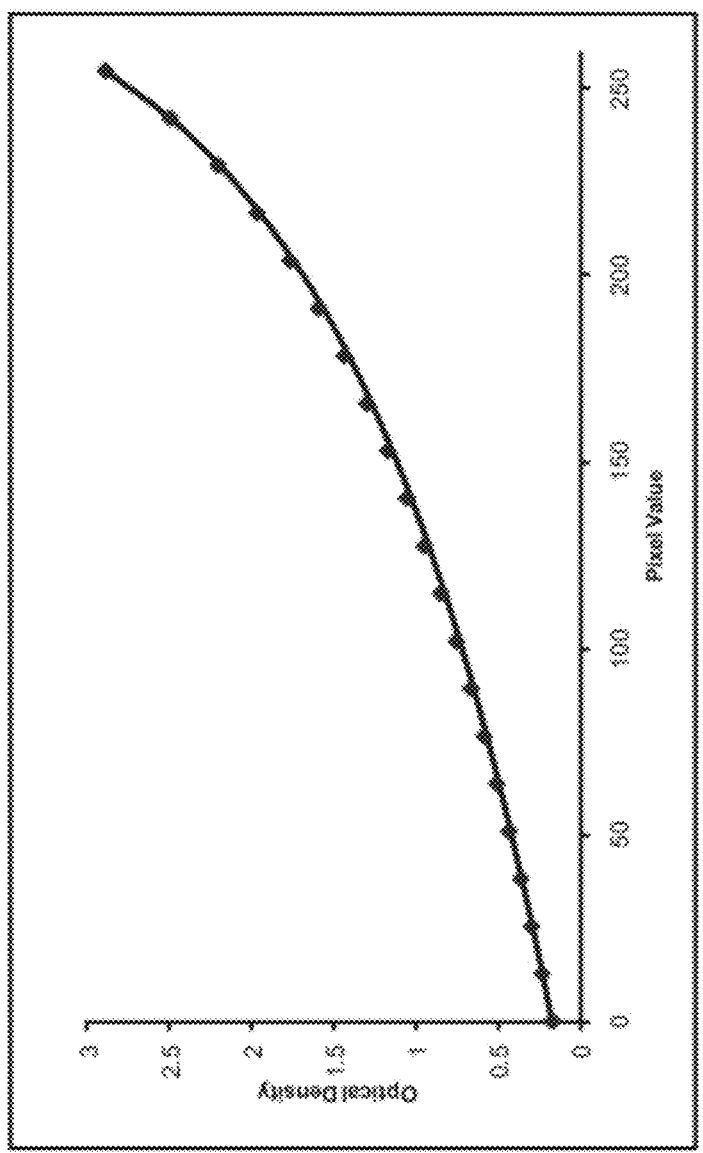
FIG. 6 shows a plot of optical density versus pixel value according to one example of the present disclosure showing the total optical density curve vs. the component optical densities.

Represented graphically in FIG. 6, the solid line represents the theoretical $OD_T$ and the dots represent the theoretical $OD_K + OD_{C,M}$ functions.

Now that there is obtained a theoretical data in the form of component optical densities $OD_K$, $OD_{C,M}$ the transfer function for converting the Pixel Value to the output values ($PV_K$ and $PV_{C,M,Y}$) for the ink nozzles for $OD_{C,M,Y}$ and $OD_K$ can be computed using the tables above as well as the earlier observed transfer functions. Simply plug in the optical densities for $OD_K$ and $OD_{C,M}$ for the various pixel values into equations 4 and 5, and solve for PixelValue. For example, at pixel value 255, for Black ink Equation 4 and input 2.22 is used for the optical density. Recalling equation 4: $OD_K = 0.0000243 * PixelValue^2 + 0.002092 * PixelValue + 0.170$, there is $2.22 - 0.0000243 * PixelValue^2 + 0.002092 * PixelValue + 0.170$. Solving for PixelValue leaves us with approximately 251.

This method can be used to approximate a lookup table such as shown in Table 2.

TABLE 2

| Input PV | Output $PV_K$ | Output $PV_{C,M,Y}$ |
|---|---|---|
| 255 | 251 | 102 |
| 242 | 234 | 84 |
| 230 | 220 | 72 |
| 217 | 206 | 64 |
| 204 | 193 | 57 |
| 191 | 181 | 51 |
| 179 | 170 | 45 |
| 166 | 159 | 41 |
| 153 | 148 | 36 |
| 140 | 137 | 32 |
| 128 | 127 | 29 |
| 115 | 117 | 25 |
| 102 | 106 | 22 |
| 89 | 96 | 19 |
| 77 | 85 | 16 |
| 64 | 74 | 13 |
| 51 | 62 | 10 |
| 38 | 50 | 7 |
| 26 | 36 | 5 |
| 13 | 20 | 3 |
| 0 | 0 | 0 |

The above table represents the output pixel values of K and CMY based on the input pixel value. For example, if the input pixel value is 102, then the black output is 106 and the CMY output is 22. Using Table 1, this produces a predicted optical density of 0.734. As will be seen next, the measured optical density actually produced turns out to be 0.75. Note that while the output values are expressed as combined CMY, the actual pixel values for C and M and Y can be computed by eliminating Y or setting it to a very low value (as it adds little to the optical density) and dividing the remaining CMY pixel amount between C and M. Thus for example, if the CMY is 22, one might set Y to 2, and then C and M each to 10.

Using the above relationships the interaction model resulted in the reproduction of theoretical $OD_T$ compared to measured Optical Density as shown in Table 3.

TABLE 3

| $OD_T$ | $OD_{meas}$ |
|---|---|
| 2.88 | 2.89 |
| 2.496 | 2.53 |
| 2.195 | 2.29 |
| 1.95 | 2.05 |
| 1.744 | 1.85 |
| 1.566 | 1.66 |
| 1.409 | 1.48 |
| 1.269 | 1.36 |
| 1.143 | 1.23 |
| 1.028 | 1.1 |
| 0.923 | 0.99 |
| 0.825 | 0.87 |
| 0.734 | 0.75 |
| 0.649 | 0.66 |
| 0.569 | 0.59 |
| 0.494 | 0.51 |
| 0.423 | 0.44 |
| 0.356 | 0.37 |
| 0.291 | 0.31 |
| 0.23 | 0.25 |
| 0.17 | 0.17 |

Figure 7:
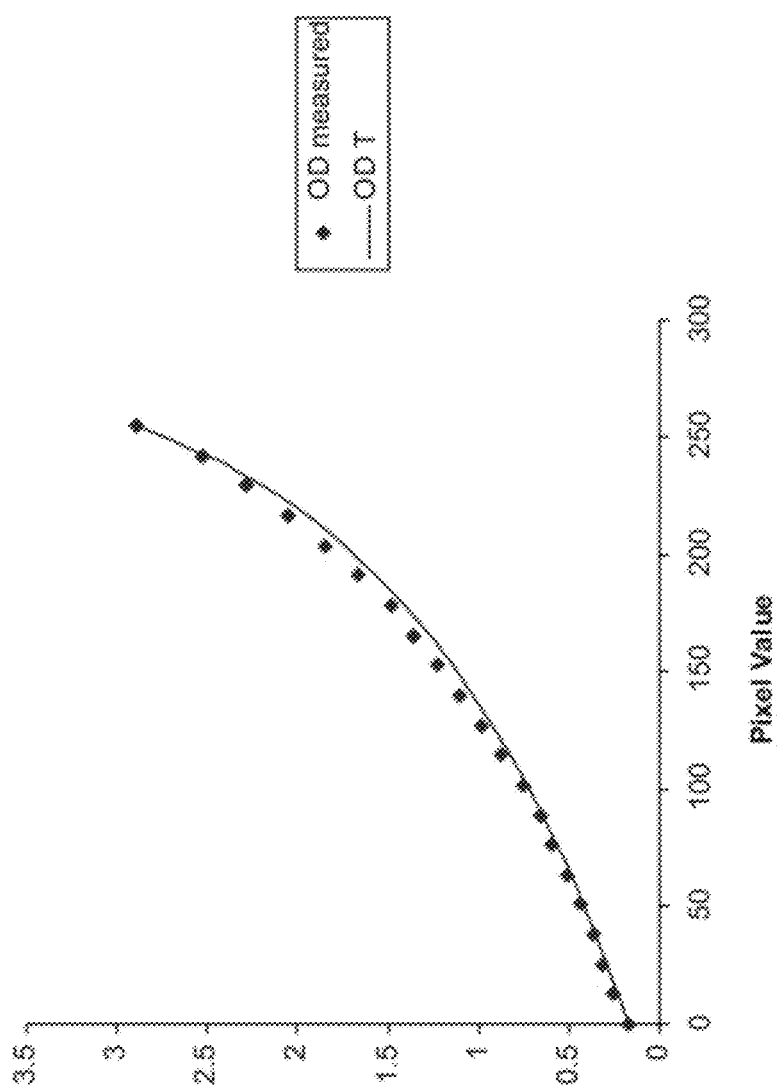
FIG. 7 shows a plot of optical density versus pixel value according to one example of the present disclosure showing the look up table vs. the theoretical optical density.
Figure 8:
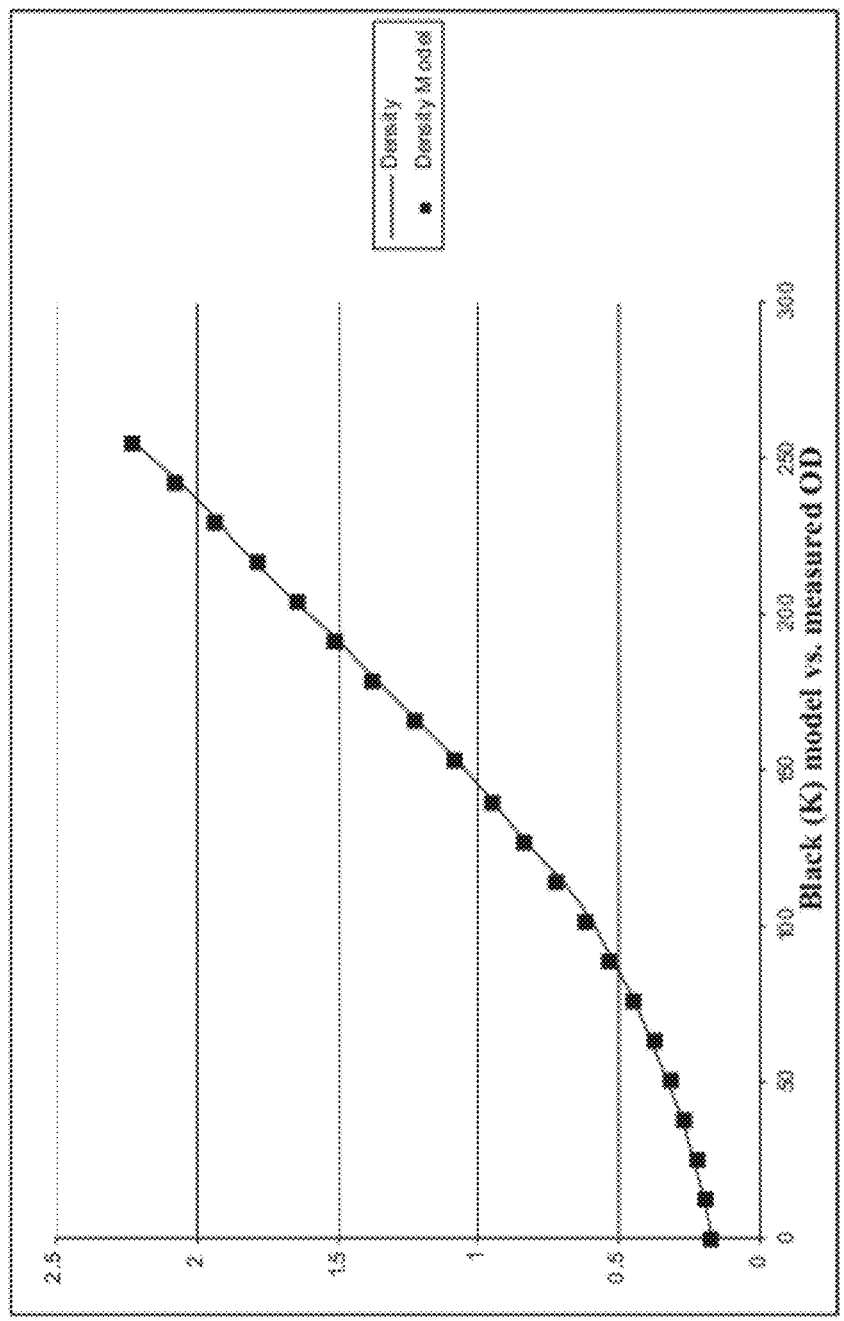
FIG. 8 shows a plot of optical density versus pixel value according to one example of the present disclosure showing the predicted optical density vs. the measured optical density for black.
Figure 9:
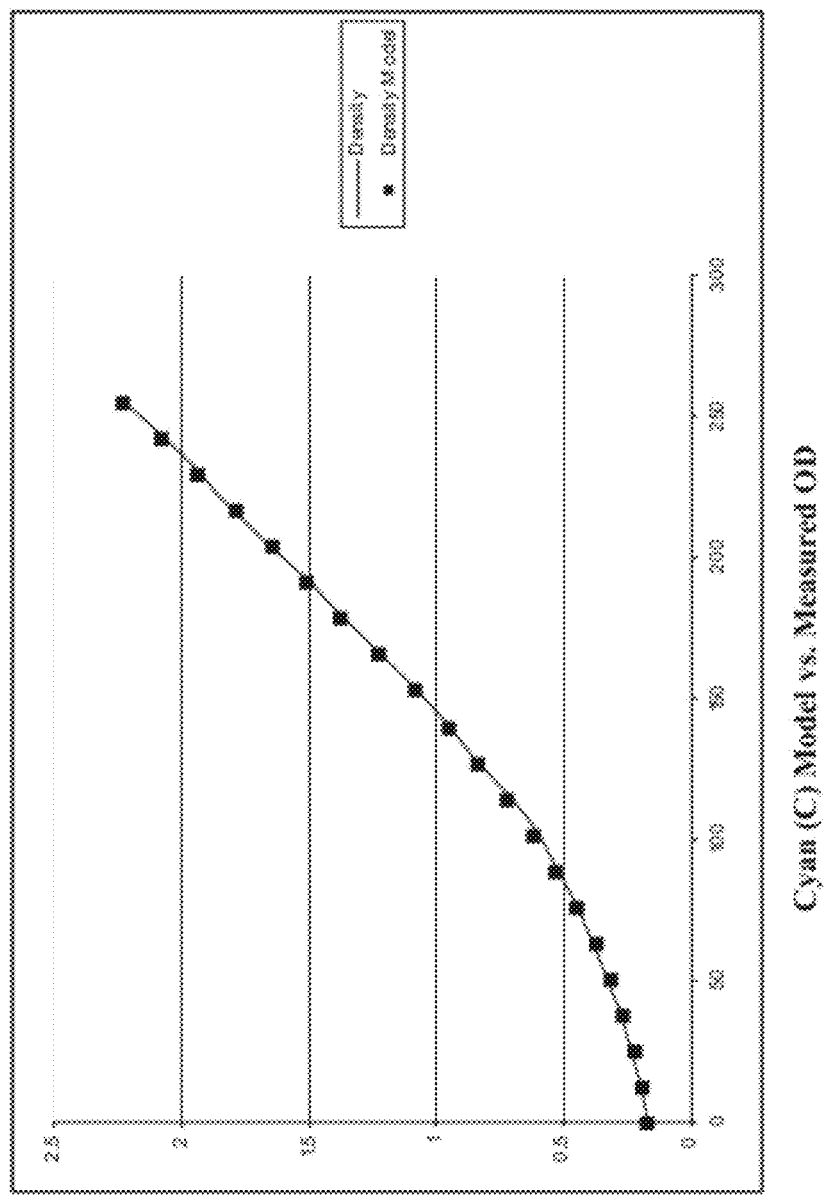
FIG. 9 shows a plot of optical density versus pixel value according to one example of the present disclosure showing the predicted optical density vs. the measured optical density for cyan.
Figure 10:
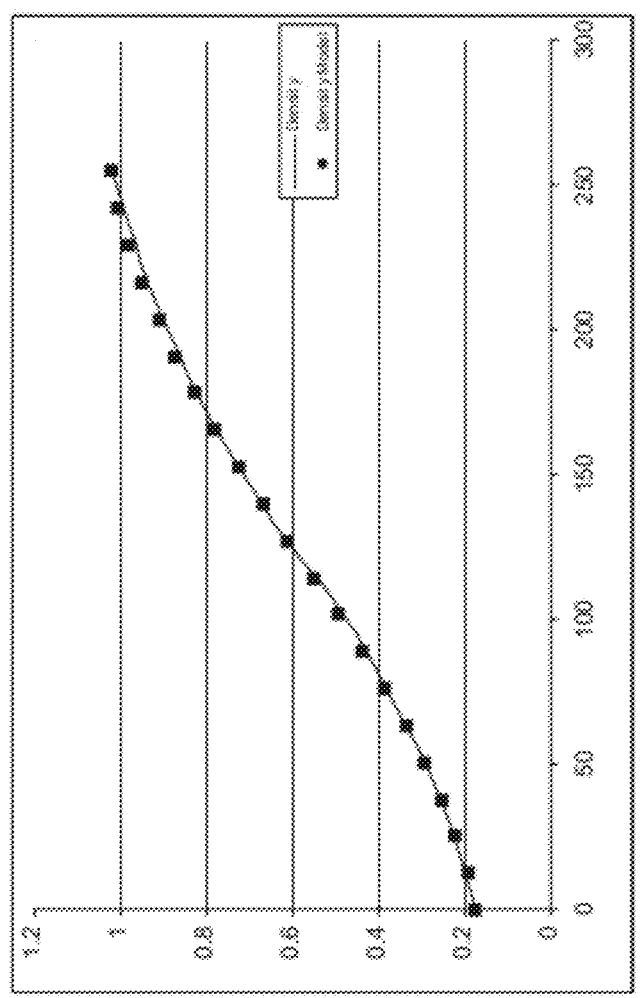
FIG. 10 shows a plot of optical density versus pixel value according to one example of the present disclosure showing the predicted optical density vs. the measured optical density for magenta.
Figure 11:
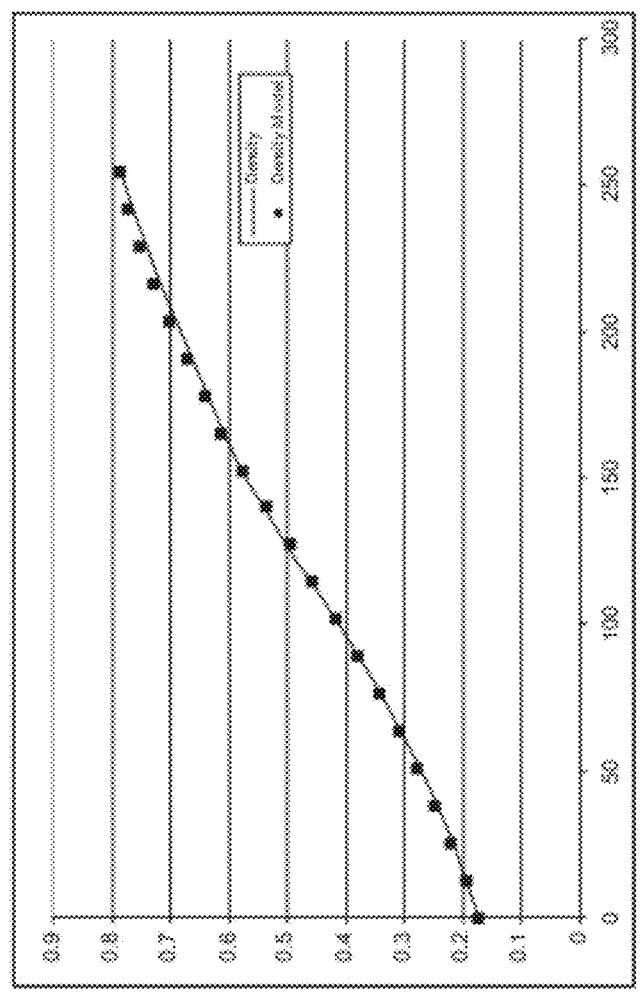
FIG. 11 shows a plot of optical density versus pixel value according to one example of the present disclosure showing the predicted optical density vs. the measured optical density for yellow.

As can be appreciated in FIG. 7, the dots indicate measured OD and the line indicates the theoretical OD based on pixel value. While the transfer function is close, it can be appreciated that the middle pixel values diverge somewhat.

CIELAB Color Space and Independent CMY Output

In the above examples, the ink output for each color nozzle CMY was more or less evenly distributed. In other examples, the ink for each color nozzle CMY can be independently controlled by the transfer function. Moreover, in an example, the transfer function can be derived from the CIE 1976 or L*,a*,b* color space instead of utilizing the CMYK color model. With the CIELAB color space, the ink can be controlled more precisely to achieve better results in the middle pixel values, as shall be shown later. Three parameters control the CIELAB colorspace: L*, a*, b*.

The CIELAB color space is predominately uniform with L* representing lightness where L*=0 is black and L*=100 is diffuse or white. The parameter a* represents tint (blue/green) and b* represents tone (red/yellow).

L* for a color may be calculated based on the CIE 1976 Tristimulus values, X, Y, Z. X and Z are used in the calculation of a* and b* respectively, whereas Y is used to calculate of L*.

Yn=100 and corresponds to the Y value for a reference whitepoint and is related to Optical Density from the well known formula as follows:

$$\left(\frac{Y}{Y_n}\right) = 10^{-OD}$$

Which in turn is related to L* as follows:

$$L^* = 116\left(\frac{Y}{Y_n}\right)^{1/3} - 16 \text{ for } Y/Yn < .008856 \text{ else}$$

$$L^* = 903.3\left(\frac{Y}{Y_n}\right)$$

Based on empirical measurements of optical density from target patches printed from a linear bit value target for C, M, Y, K, L* may be described relative to Pixel value. These patches were printed on an Epson 4900 Stylus Pro machine and measured with an X-Rite densitometer.

The nature of the response curve between pixel value and optical density may be non-linear and described using one or more equations. These equations, shown below, may be based on empirical response curves which may be obtained in the manner described above with respect to equations 4 and 5. L* may be represented for the region between Pixel Values (PV) 0 and 166 as:

$$L^* = \frac{(L^*_{max} - L^*_{min})}{e^{-1/\sigma}}\left(\frac{255 - PV}{255}\right)^{\beta} e^{-\left(\frac{255-PV}{255}\right)^{\alpha}/\sigma} + L^*_{min} \qquad \text{Equation 6}$$

In the equation above, σ and β represent parameters to optimize fit and are based on empirical observation as recorded in the table below. The parameters were determined by plotting measured data and the model on the same graph and adjusting the model parameters until a satisfactory fit was achieved. These parameters are media and ink specific and if the media or ink changes characteristics then the model needs to be adjusted. Separate fit values may be calculated for each of K, C, M, and Y.

| | 0 < PV < 166 | | | |
|---|---|---|---|---|
| | K | C | M | Y |
| β | 1.5 | 1.7 | 1.8 | 1.5 |
| σ | 2.6 | 2.6 | 2.6 | 2.6 |
| α | 3.2 | 2.2 | 3.3 | .7 |
| $L^*_{max}$ | 85.65 | 85.65 | 85.65 | 85.65 |
| $L^*_{min}$ | 5.36 | 47.46 | 36.97 | 69.62 |

For pixel values (PV) above 166, L* may be represented as follows:

$$L^* = (L^*_{max} - L^*_{min})\left(\frac{255 - PV}{255}\right)^{\beta} + L^*_{min} \qquad \text{Equation 7}$$

| | K | C | M | Y |
|---|---|---|---|---|
| β | 1.2 | 1.35 | 1.45 | 1.25 |
| $L_{max}^*$ | 85.65 | 85.65 | 85.65 | 85.65 |
| $L_{min}^*$ | 5.36 | 47.46 | 36.97 | 69.62 |

Again, the fit values for Black, Cyan, Magenta and Yellow ink have been derived empirically. From the L* values above one can calculate the theoretical Optical Density from the following relationship:

$$L^* = 116(10^{-OD})^{1/3} - 16 \qquad \text{Equation 8:}$$

for OD<2.053 else $L^* = 903.3(10^{-OD})$

Figure 12:
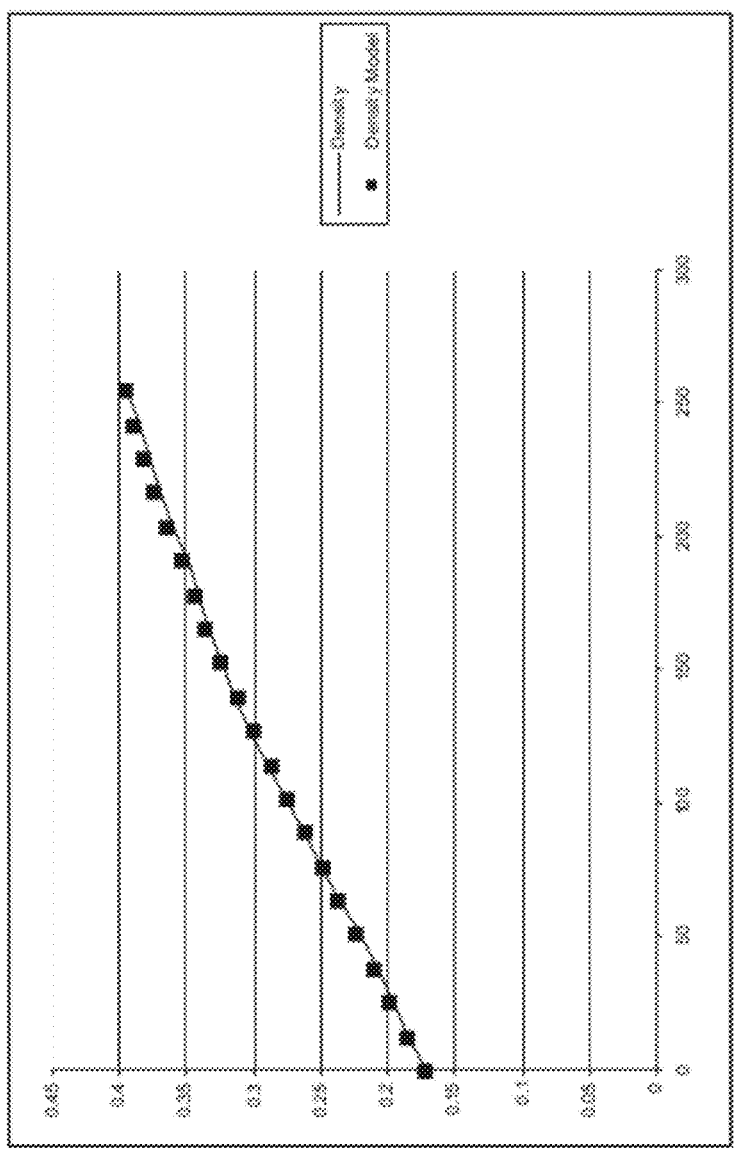
FIG. 12 shows a plot of optical density versus pixel value according to one example of the present disclosure showing the predicted optical density vs. the measured optical density.

FIGS. 8-12 show the OD predicted by the empirically derived model vs measured optical density for the individual colors and black. The dots represent modeled values, and the line represents actual measured values. FIG. 12 shows the total (where total=C+M+Y+K).

The method above describes one of one or more method(s) for controlling both the ratios of K to C,M,Y and C,M,Y to (C+M+Y) and adjusting γ's for C,M,Y.

Below are 3 examples of different ink combinations which will achieve reasonably similar Optical Density curves.

Example 1

| | K | C | M | Y | Total | C/C + M + Y | 48% |
|---|---|---|---|---|---|---|---|
| Dmax | 2.226 | .3 | .3 | .025 | 2.851 | M/C + M + Y | 48% |
| Dmin | .17 | 0 | 0 | 0 | .17 | Y/C + M + Y | 4% |
| γ | 1.9 | 1 | 1 | 1 | | C + M + Y/K | 28% |

Figure 13:
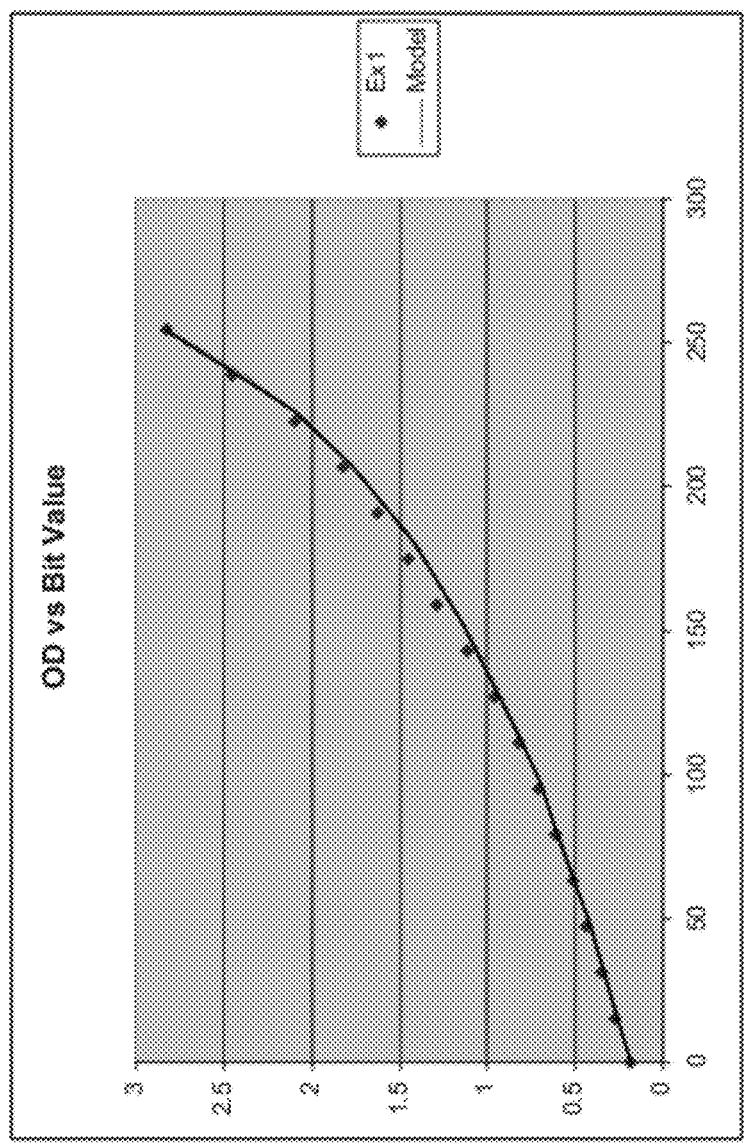
FIG. 13 shows a plot of optical density versus pixel value (bit value) according to one example of the present disclosure showing the predicted optical density vs. the measured optical density for example 1.

To calculate the LUT, first the desired optical density values for the LUT are calculated by using equation 2 and 3 for the various input pixel values. Next, using equation 8, L* is calculated. The value of L* is then fed into either equations 6 and 7 and pixel value is solved for. Example 1 is shown in FIG. 13. The resulting LUT in one example may be as shown in Table 4.

TABLE 4

| Input PV | Output $PV_K$ | Output $PV_C$ | Output $PV_M$ | Output $PV_Y$ |
|---|---|---|---|---|
| 255 | 255 | 121 | 97 | 26 |
| 242 | 226 | 113 | 92 | 25 |
| 230 | 204 | 107 | 88 | 23 |
| 217 | 184 | 100 | 84 | 22 |
| 204 | 170 | 94 | 79 | 21 |
| 191 | 157 | 88 | 75 | 20 |
| 179 | 146 | 82 | 71 | 17 |
| 166 | 136 | 77 | 66 | 16 |
| 153 | 126 | 71 | 61 | 15 |
| 140 | 116 | 65 | 57 | 14 |
| 128 | 107 | 59 | 53 | 12 |
| 115 | 98 | 53 | 48 | 11 |
| 102 | 89 | 48 | 44 | 10 |
| 89 | 81 | 42 | 39 | 9 |
| 77 | 72 | 36 | 35 | 7 |
| 64 | 63 | 31 | 30 | 6 |
| 51 | 54 | 25 | 26 | 5 |
| 38 | 44 | 19 | 20 | 4 |
| 26 | 33 | 13 | 14 | 2 |
| 13 | 20 | 7 | 7 | 1 |
| 0 | 0 | 0 | 0 | 0 |

Example 2

|      | K     | C  | M  | Y    |       |         |        |
|------|-------|----|----|------|-------|---------|--------|
| Dmax | 2.226 | .4 | .4 | .025 | 3.051 | M/C+M+Y | 48.50% |
| Dmin | .17   | 0  | 0  | 0    | .17   | Y/C+M+Y | 3%     |
| γ    | −1.75 | 1  | 1  | 1    |       | C+M+Y/K | 37%    |

Figure 14:
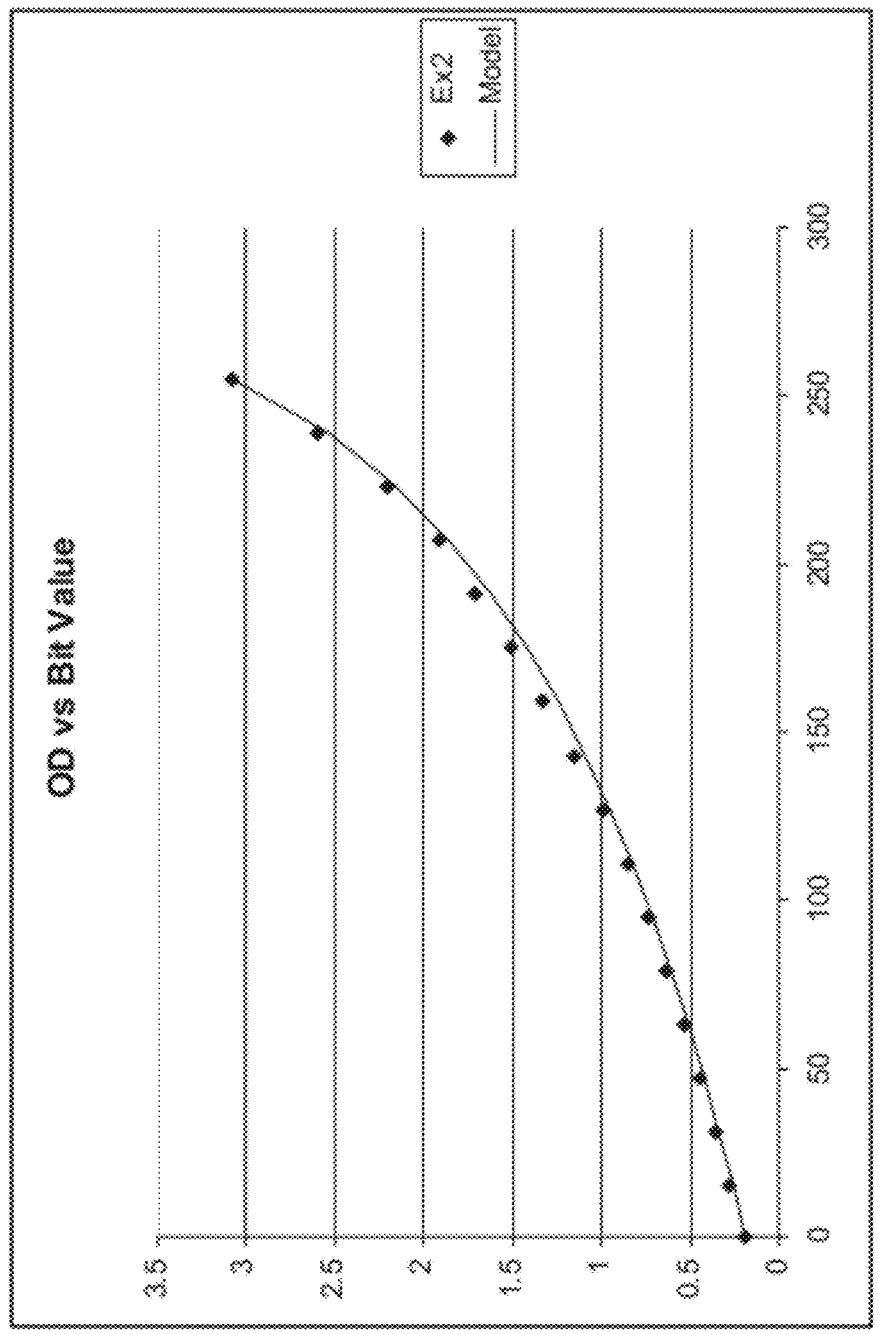
FIG. 14 shows a plot of optical density versus pixel value (bit value) according to one example of the present disclosure showing the predicted optical density vs. the measured optical density for example 2.

Example 2 is shown in FIG. 14. As in example 1, the values for the LUT are first calculated by using equation 2, and 3 to calculate optical density for the various input pixel values. Next, using equation 8, L* is calculated. That value is then fed into equation 6 or 7 and pixel value is solved for. The resulting LUT in one example may be as shown in Table 5.

TABLE 5

| Input PV | Output $PV_K$ | Output $PV_C$ | Output $PV_M$ | Output $PV_Y$ |
|----------|---------------|---------------|---------------|---------------|
| 255 | 255 | 152 | 120 | 26 |
| 242 | 223 | 142 | 113 | 25 |
| 230 | 198 | 133 | 106 | 23 |
| 217 | 178 | 124 | 100 | 22 |
| 204 | 164 | 116 | 94  | 21 |
| 191 | 152 | 107 | 88  | 20 |
| 179 | 140 | 100 | 83  | 17 |
| 166 | 130 | 92  | 78  | 16 |
| 153 | 120 | 85  | 73  | 15 |
| 140 | 111 | 78  | 67  | 14 |
| 128 | 102 | 71  | 62  | 12 |
| 115 | 93  | 64  | 56  | 11 |
| 102 | 85  | 57  | 51  | 10 |
| 89  | 76  | 50  | 46  | 9  |
| 77  | 68  | 43  | 40  | 7  |
| 64  | 59  | 36  | 35  | 6  |
| 51  | 50  | 30  | 30  | 5  |
| 38  | 41  | 23  | 24  | 4  |
| 26  | 31  | 16  | 17  | 2  |
| 13  | 19  | 8   | 9   | 1  |
| 0   | 0   | 0   | 0   | 0  |

Example 3

|      | K    | C  | M  | Y    |       |         |        |
|------|------|----|----|------|-------|---------|--------|
| Dmax | 2    | .5 | .5 | .025 | 3.025 | M/C+M+Y | 48.80% |
| Dmin | .17  | 0  | 0  | 0    | .17   | Y/C+M+Y | 2.40%  |
| γ    | −1.5 | 1  | 1  | 1    |       | C+M+Y/K | 51.20% |

Figure 15:
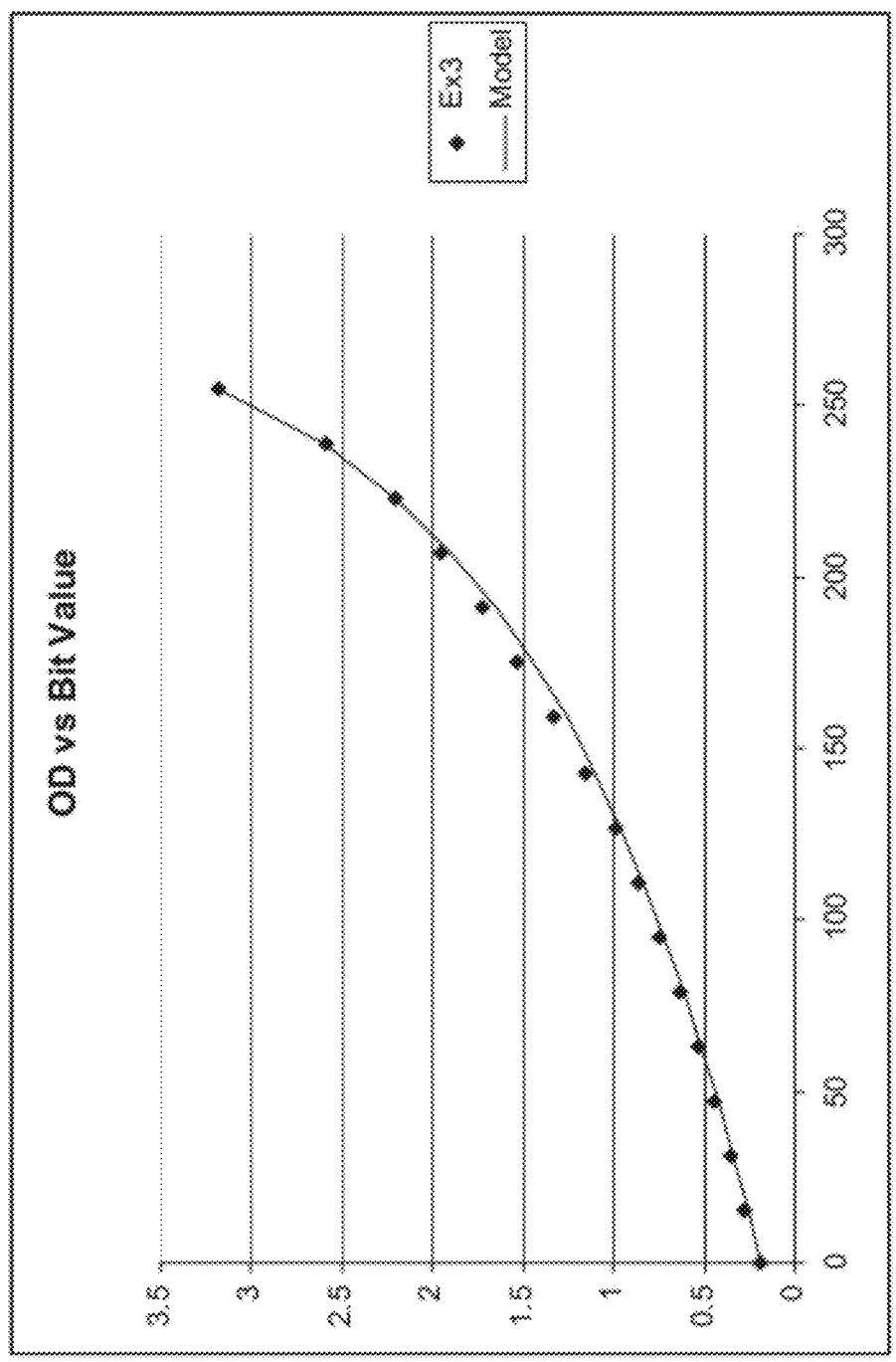
FIG. 15 shows a plot of optical density versus pixel value (bit value) according to one example of the present disclosure showing the predicted optical density vs. the measured optical density for example 3.

Example 3 is shown in FIG. 15. As before, the values for the LUT are first calculated by using equation 2, and 3 to calculate optical density for the various input pixel values. Next, using equation 8, L* is calculated. That value is then fed into equation 6 or 7 and pixel value is solved for. The resulting LUT in one example may be as shown in Table 6.

TABLE 6

| Input PV | Output $PV_K$ | Output $PV_C$ | Output $PV_M$ | Output $PV_Y$ |
|----------|---------------|---------------|---------------|---------------|
| 255 | 236 | 192 | 141 | 26 |
| 242 | 206 | 173 | 132 | 25 |
| 230 | 182 | 157 | 123 | 23 |
| 217 | 166 | 145 | 115 | 22 |
| 204 | 153 | 134 | 108 | 21 |
| 191 | 141 | 125 | 100 | 20 |
| 179 | 130 | 115 | 93  | 17 |
| 166 | 121 | 105 | 87  | 16 |
| 153 | 111 | 96  | 81  | 15 |
| 140 | 102 | 88  | 75  | 14 |
| 128 | 94  | 81  | 69  | 12 |
| 115 | 86  | 73  | 63  | 11 |
| 102 | 78  | 65  | 57  | 10 |
| 89  | 71  | 57  | 51  | 9  |
| 77  | 63  | 49  | 45  | 7  |
| 64  | 55  | 41  | 38  | 6  |
| 51  | 47  | 33  | 32  | 5  |
| 38  | 38  | 26  | 26  | 4  |
| 26  | 28  | 18  | 19  | 2  |
| 13  | 17  | 9   | 10  | 1  |
| 0   | 0   | 0   | 0   | 0  |

Figure 16:
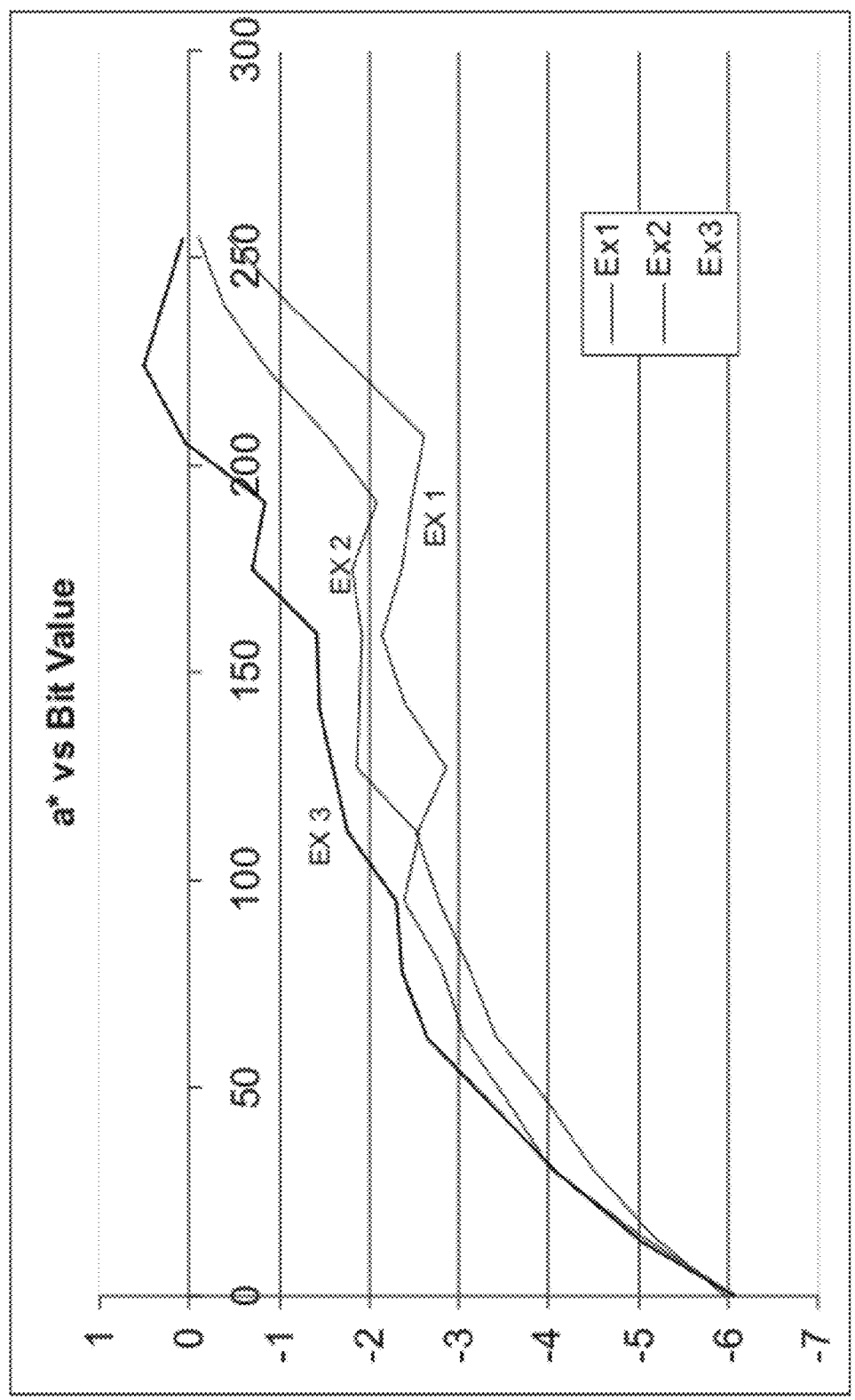
FIG. 16 shows a plot of a* vs. pixel value (bit value) in the three examples, according to an example.
Figure 17:
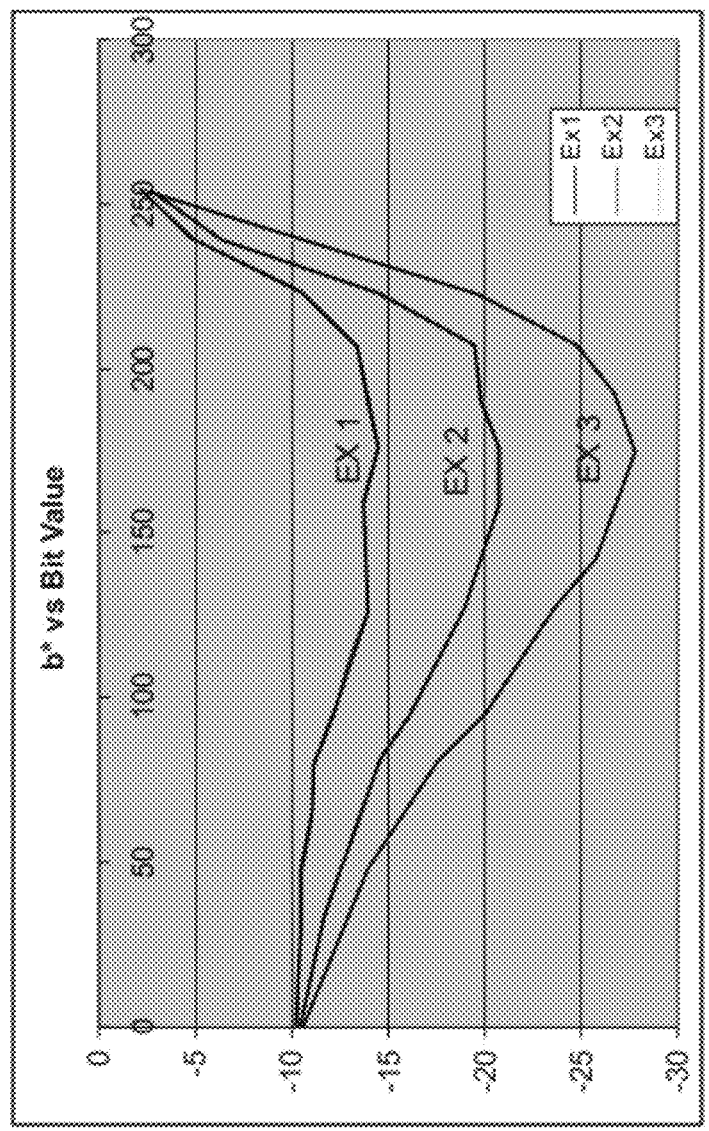
FIG. 17 shows a plot of b* vs. pixel value (bit value) in the three examples, according to an example.
Figure 18:
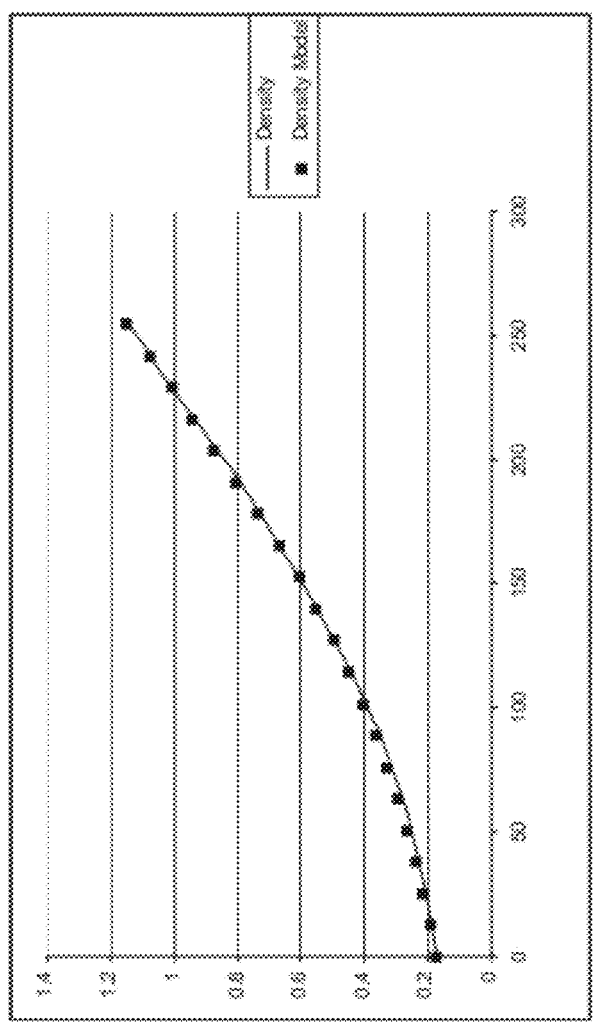
FIG. 18 shows a plot of optical density vs. pixel value comparing the density model and the observed optical densities for light black.
Figure 19:
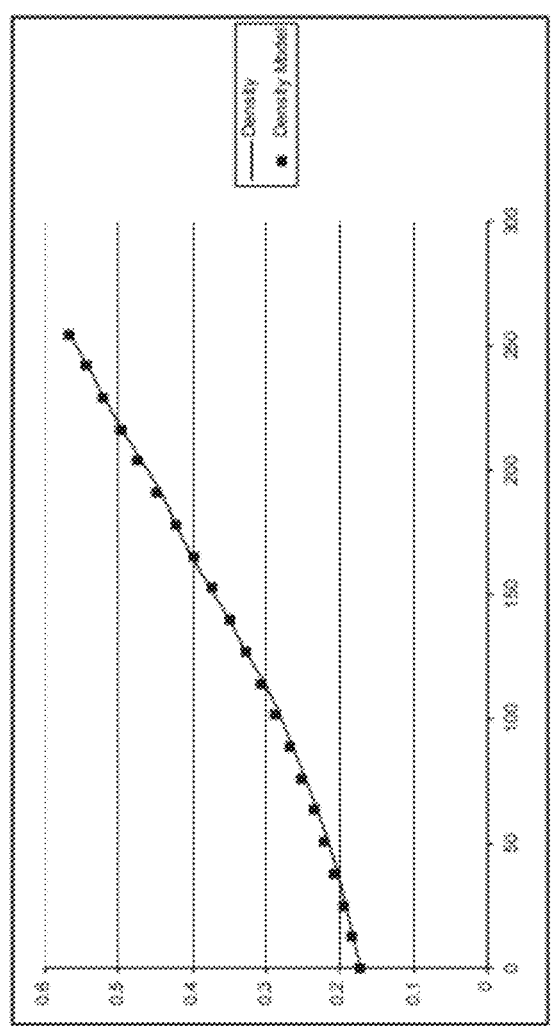
FIG. 19 shows a plot of optical density vs. pixel value comparing the density model and the observed optical densities for light cyan.
Figure 20:
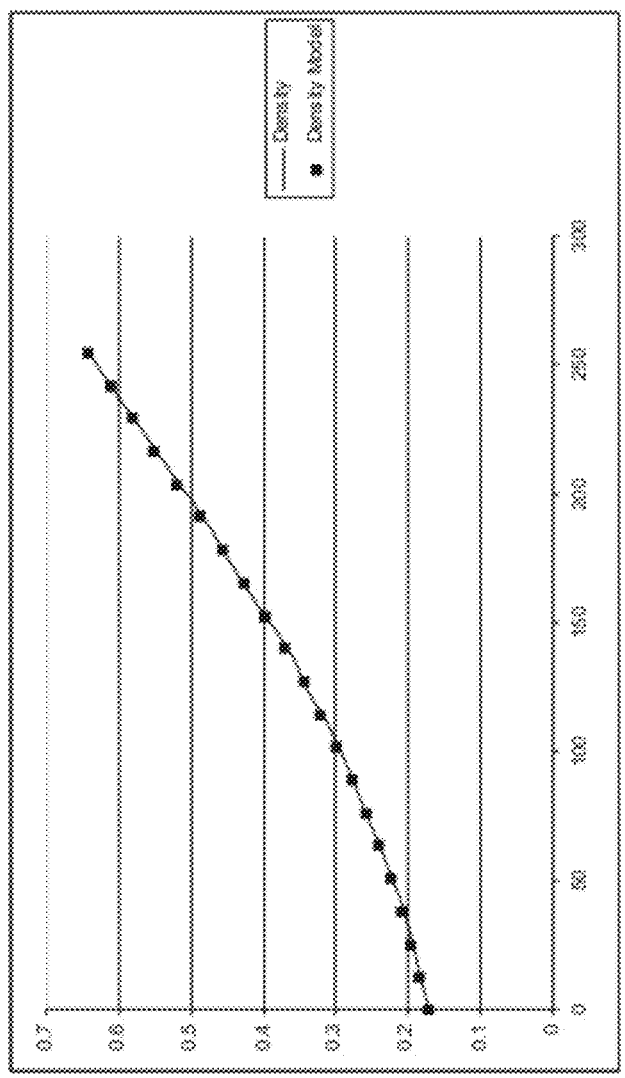
FIG. 20 shows a plot of optical density vs. pixel value comparing the density model and the observed optical densities for light magenta.
Figure 21:
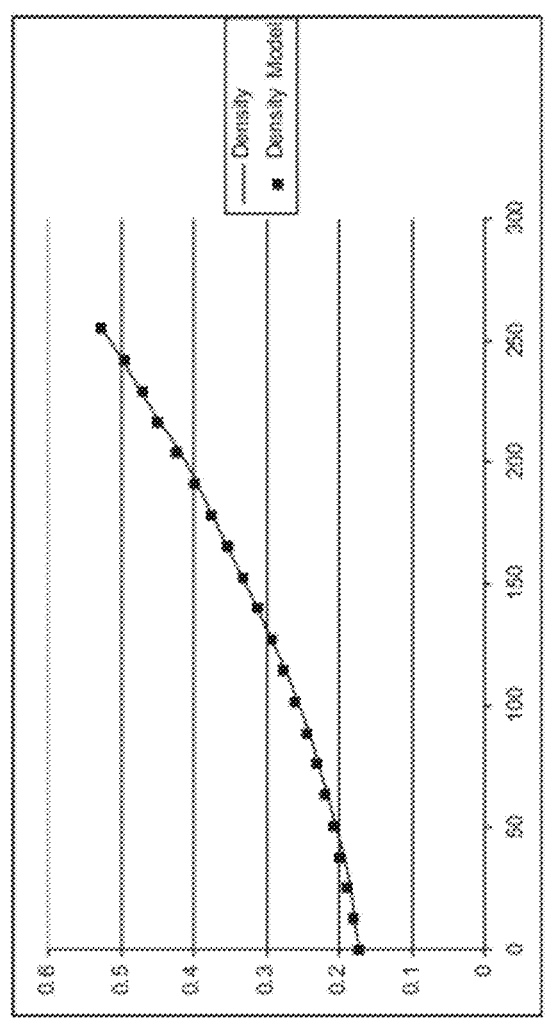
FIG. 21 shows a plot of optical density vs. pixel value comparing the density model and the observed optical densities for light light black.

The three examples above demonstrate how similar optical density may be achieved using the methodology described herein with different amounts of the one or more ink colors comprising the inks 160. However, the Tint & Tone for the 3 examples are quite different as shown by FIGS. 16 and 17.

Use of Light Inks

It is possible to achieve a desired tint and tone as well as linear optical density as described above with 4 inks comprising Black, Cyan, Magenta, and Yellow. In some examples, the use of these inks in areas of low density may result in increased graininess. One method to reduce graininess in areas of low density comprises the use of additional "light" inks which create less density per volume and therefore allow for the printer to lay down more "dots" per inch, thereby reducing graininess, but keeping the optical density the same.

As developed above, total Optical Density, $OD_T$ may be described as comprising the sum of the optical density curves of the one or more individual inks 142.

$$OD_T = OD_K + OD_C + OD_M + OD_Y$$

This equation may be further expanded to include the use of light inks as well. The Cyan Optical Density above may be thought of as comprising the total optical density of the optical density curves for the one or more Cyan inks which may comprise regular and light Cyan as shown below:

$$OD_{CT} = OD_C + OD_{LC}$$

Similarly, Magenta and Black Optical Density may comprise the Optical Density of the individual inks as shown below:

$$OD_{MT} = OD_M + OD_{LM}$$

$$OD_{KT} = OD_K + OD_{LK} + OD_{LLK}$$

This may result in the following description of total Optical Density.

$$OD_T = OD_{KT} + OD_{CT} + OD_{MT} + OD_Y$$

With this new schema a weighting function is introduced to "weight" how much dark ink to light ink to use throughout the Bit Value range.

$$WF = e^{\left(-\frac{\left(1 - \frac{PV}{255}\right)^2}{Spread}\right)}$$

Where the spread is another fit parameter which determines the "spread" of the Gaussian distribution.

$$OD_C = OD_{CT} * WF_C \text{ and } OD_{LC} = OD_{CT} - OD_C$$

$$OD_M = OD_{MT} * WF_M \text{ and } OD_{LM} = OD_{MT} - OD_M$$

$$OD_K = OD_{KT} * WF_K \text{ and } OD_{LK} = WF_{LK} * (OD_{KT} - OD_K)$$

$$\text{and } OD_{LLK} = OD_{KT} - (OD_K + OD_{LLK})$$

As described earlier, a Transformation or LUT's for the Light inks: L* and PV relationship may be derived empirically.

$$L^* = \frac{(L^*_{max} - L^*_{min})}{e^{-1/\sigma}} \left(\frac{255 - PV}{255}\right)^\beta e^{-\left(\frac{255-PV}{255}\right)^\alpha / \sigma} + L^*_{min}$$

$0 < PV < 216$

|  | LK | LC | LM | LLK |
|---|---|---|---|---|
| β | 1.32 | 1.3 | 1.25 | 1.15 |
| σ | 1.55 | 1.6 | 1.6 | 1.6 |
| α | 1.26 | 1.15 | 1.15 | 1.11 |
| $L^*_{max}$ | 85.65 | 85.65 | 85.65 | 85.65 |
| $L^*_{min}$ | 32.06 | 59.04 | 54.86 | 61.45 |

For PV>216:

$$L^* = (L^*_{max} - L^*_{min})\left(\frac{255 - PV}{255}\right)^\beta + L^*_{min}$$

|  | LK | LC | LM | LLK |
|---|---|---|---|---|
| β | .98 | .98 | .95 | .85 |
| $L^*_{max}$ | 85.65 | 85.65 | 85.65 | 85.65 |
| $L^*_{min}$ | 32.06 | 59.04 | 54.86 | 61.45 |

FIGS. 18-21 illustrate the density model vs. observed optical densities for the light inks.

Example 4

Example 4 is with regard to the Inclusion of Light Inks.

|  | KT | CT | MT | Y | Total | C/C + M + Y | 48% |
|---|---|---|---|---|---|---|---|
| Dmax | 2.226 | .3 | .3 | .025 | 2.851 | M/C + M + Y | 48% |
| Dmin | .17 | 0 | 0 | 0 | .17 | Y/C + M + Y | 4% |
| γ | −1.9 | 1 | 1 | 1 |  | C + M + Y/K | 28% |

With the follow weighted values:

|  | $WF_K$ | $WF_C$ | $WF_M$ | $WF_{LK}$ |
|---|---|---|---|---|
| Spread | .125 | .1 | .1 | 1 |

Figure 22:
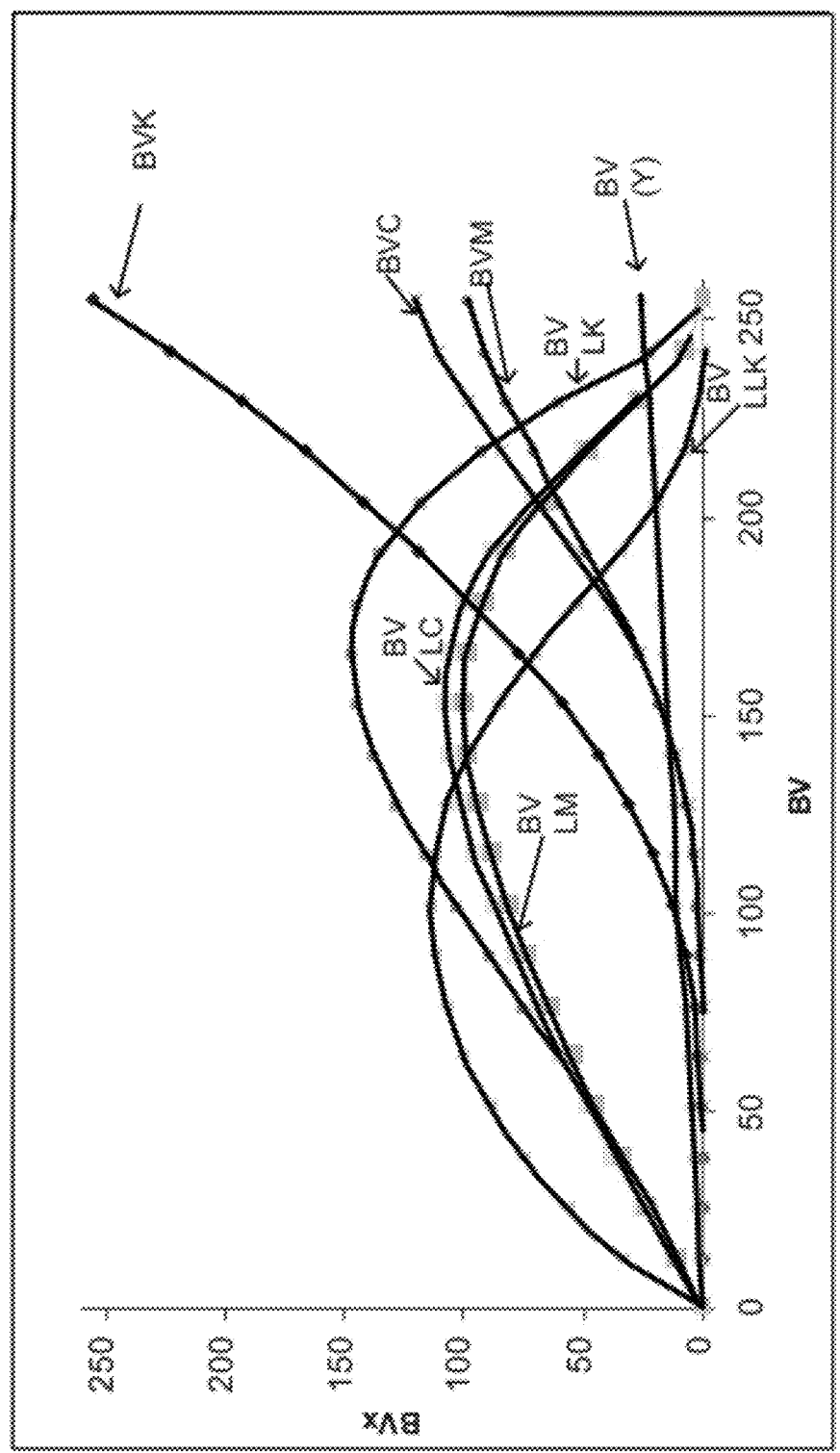
FIG. 22 shows a plot of output pixel values (BVx) for a given input pixel value (BV) according to one example of the present disclosure.
Figure 23:
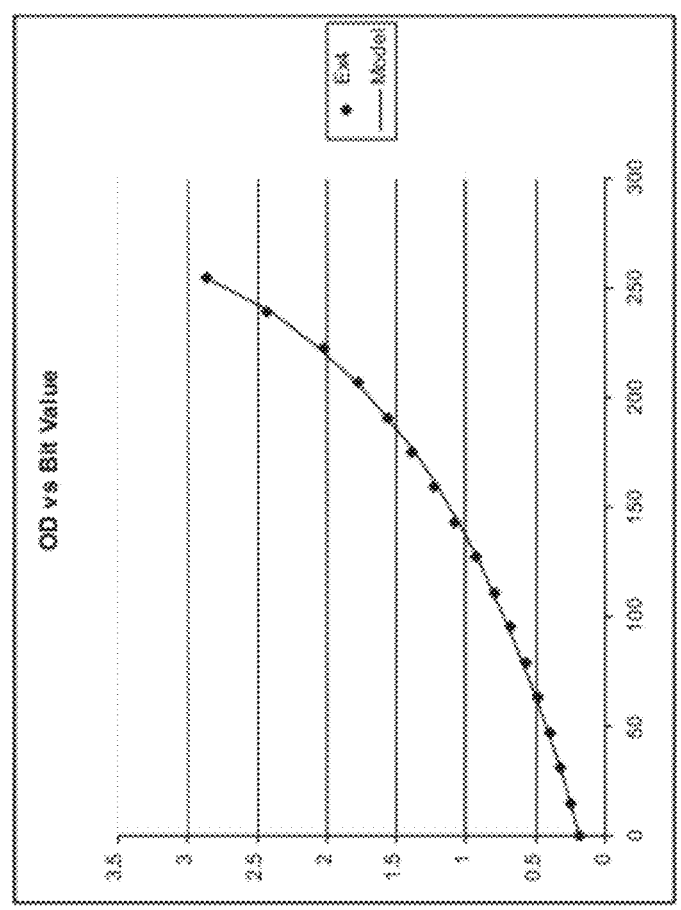
FIG. 23 shows a plot of optical density versus pixel value (bit value) according to one example of the present disclosure showing the predicted optical density vs. the measured optical density for example 4.

FIG. 22 graphically illustrates the various output ink values per given input bit values for the various color inks. FIG. 23 shows the optical density curve for Example 4. As in example 1, the values for the LUT are first calculated by using equation 2 and 3 to calculate optical density for the various input pixel values. Next, using equation 8, L* is calculated. That value is then fed into equations 6 or 7 and pixel value is solved for. Note that to split the input optical densities for Equations 6 and 7 into the regular and light components, the following formulas may be used:

$$OD_C = OD_{CT} * WF_C \text{ and } OD_{LC} = OD_{CT} - OD_C$$

$$OD_M = OD_{MT} * WF_M \text{ and } OD_{LM} = OD_{MT} - OD_M$$

$$OD_K = OD_{KT} * WF_K \text{ and } OD_{LK} = WF_{LK} * (OD_{KT} - OD_K)$$

$$\text{and } OD_{LLK} = OD_{KT} - (OD_K + OD_{LLK})$$

The resulting LUT in one example may be as shown in Table 7.

TABLE 7

| Input PV | Output $PV_K$ | Output $PV_{LK}$ | Output $PV_{LLK}$ | Output $PV_C$ | Output $PV_{LC}$ | Output $PV_M$ | Output $PV_{LM}$ | Output $PV_Y$ |
|---|---|---|---|---|---|---|---|---|
| 255 | 255 | 0 | 0 | 121 | 0 | 97 | 0 | 26 |
| 242 | 223 | 22 | 0 | 111 | 9 | 91 | 8 | 25 |
| 230 | 193 | 60 | 2 | 98 | 28 | 82 | 27 | 23 |
| 217 | 166 | 93 | 8 | 84 | 51 | 72 | 48 | 22 |
| 204 | 142 | 118 | 20 | 68 | 72 | 60 | 67 | 21 |
| 191 | 119 | 135 | 35 | 53 | 89 | 48 | 83 | 20 |
| 179 | 97 | 144 | 53 | 39 | 100 | 37 | 93 | 17 |
| 166 | 77 | 147 | 70 | 27 | 106 | 27 | 99 | 16 |
| 153 | 59 | 145 | 86 | 18 | 108 | 19 | 100 | 15 |
| 140 | 44 | 138 | 98 | 11 | 106 | 12 | 99 | 14 |
| 128 | 31 | 128 | 107 | 6 | 102 | 7 | 95 | 12 |
| 115 | 21 | 116 | 112 | 3 | 96 | 4 | 89 | 11 |
| 102 | 13 | 103 | 114 | 2 | 88 | 2 | 82 | 10 |
| 89 | 7 | 89 | 112 | 1 | 79 | 1 | 74 | 9 |
| 77 | 3 | 75 | 108 | 0 | 69 | 0 | 65 | 7 |
| 64 | 2 | 60 | 100 | 0 | 60 | 0 | 56 | 6 |
| 51 | 1 | 46 | 89 | 0 | 49 | 0 | 46 | 5 |
| 38 | 0 | 33 | 75 | 0 | 38 | 0 | 35 | 4 |
| 26 | 0 | 21 | 57 | 0 | 26 | 0 | 24 | 2 |
| 13 | 0 | 10 | 33 | 0 | 13 | 0 | 12 | 1 |
| 0 | 0 | 0 | 0 | 0 | 0 | 0 | 0 | 0 |

Example 5

Example 5 is with regard to the Inclusion of Light Inks.

|      | KT    | CT | MT  | Y | Total | C/C + M + Y | 48.4% |
|------|-------|----|-----|---|-------|-------------|-------|
| Dmax | 2.226 | .3 | .32 | 0 | 2.851 | M/C + M + Y | 51.6% |
| Dmin | .17   | 0  | 0   | 0 | .17   | Y/C + M + Y | 0%    |
| γ    | −1.9  | 1  | 1   | 1 |       | C + M + Y/K | 27%   |

With the follow weighted values:

|        | $WF_K$ | $WF_C$ | $WF_M$ | $WF_{LK}$ |
|--------|--------|--------|--------|-----------|
| Spread | .125   | .1     | .1     | 1         |

Figure 24:
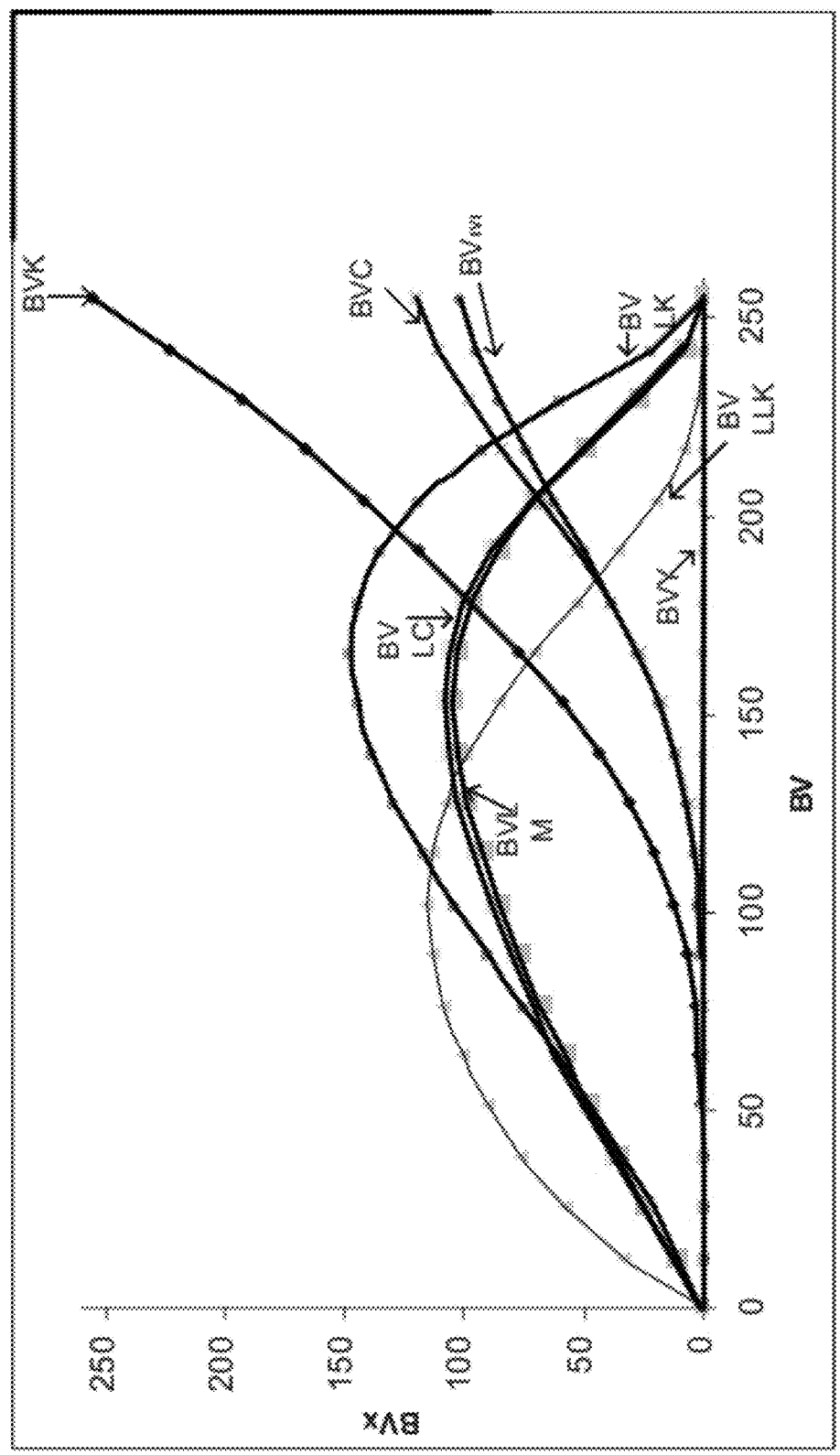
FIG. 24 shows a plot of output pixel values (BVx) for a given input pixel value (BV) according to one example of the present disclosure.
Figure 25:
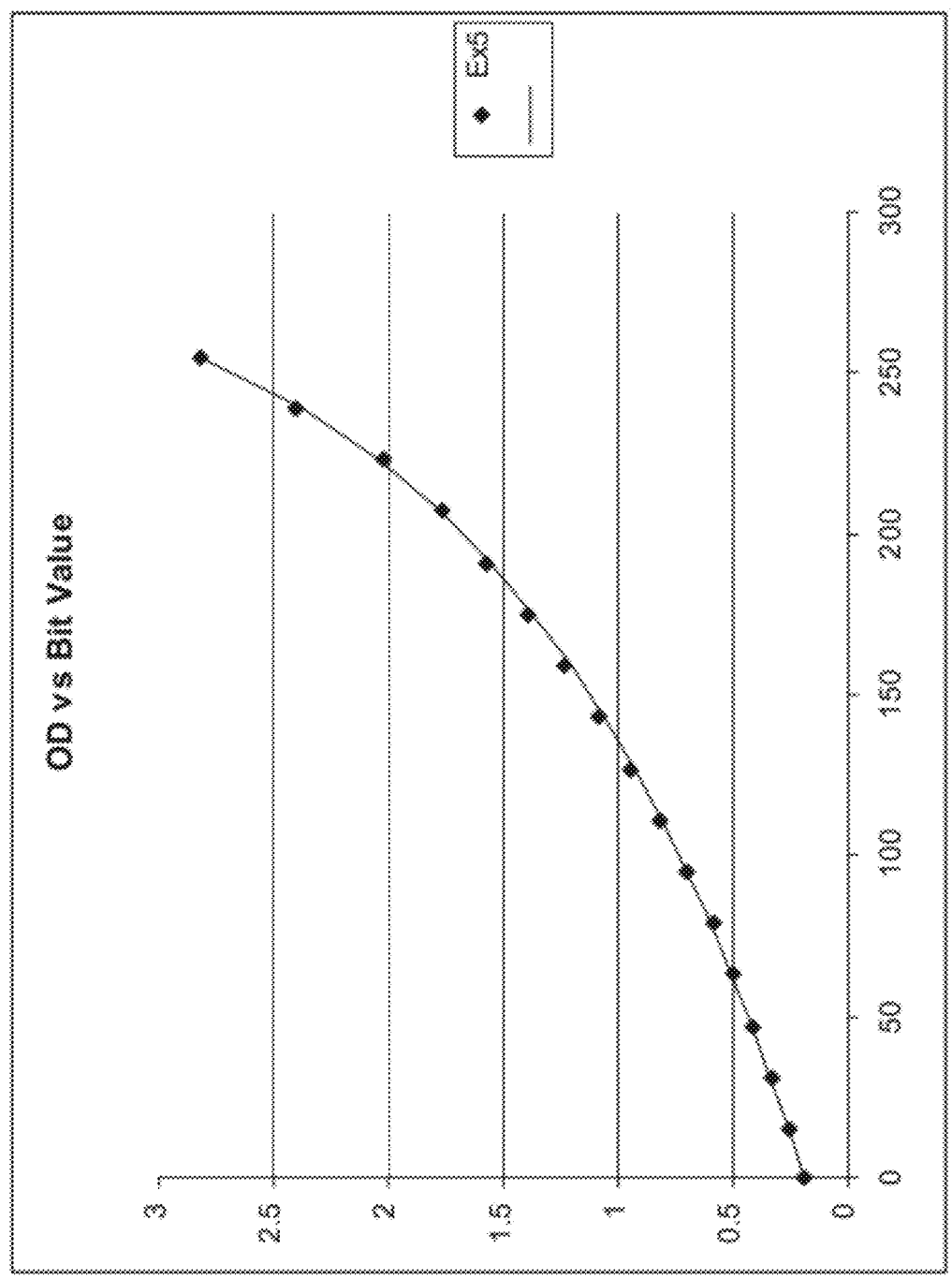
FIG. 25 shows a plot of optical density versus pixel value (bit value) according to one example of the present disclosure showing the predicted optical density vs. the measured optical density for example 5.

FIG. 24 graphically illustrates the various output ink values per given input bit values for the various color inks. FIG. 25 shows the optical density curve for Example 5. Again, the actual LUT can be calculated in the same manner as example 4. One example LUT may be as shown in Table 8.

TABLE 8

| Input PV | Output $PV_K$ | Output $PV_{LK}$ | Output $PV_{LLK}$ | Output $PV_C$ | Output $PV_{LC}$ | Output $PV_M$ | Output $PV_{LM}$ | Output $PV_Y$ |
|---|---|---|---|---|---|---|---|---|
| 255 | 255 | 0   | 0   | 121 | 0   | 102 | 0   | 0 |
| 242 | 223 | 22  | 0   | 111 | 9   | 95  | 8   | 0 |
| 230 | 193 | 60  | 2   | 98  | 28  | 86  | 28  | 0 |
| 217 | 166 | 93  | 8   | 84  | 51  | 75  | 50  | 0 |
| 204 | 142 | 119 | 20  | 68  | 72  | 62  | 70  | 0 |
| 191 | 119 | 135 | 36  | 53  | 89  | 50  | 86  | 0 |
| 179 | 97  | 145 | 53  | 39  | 100 | 38  | 97  | 0 |
| 166 | 77  | 148 | 71  | 27  | 106 | 28  | 103 | 0 |
| 153 | 59  | 145 | 86  | 18  | 108 | 20  | 105 | 0 |
| 140 | 44  | 139 | 99  | 11  | 106 | 13  | 103 | 0 |
| 128 | 31  | 129 | 108 | 6   | 102 | 7   | 99  | 0 |
| 115 | 21  | 117 | 113 | 3   | 96  | 4   | 93  | 0 |
| 102 | 13  | 104 | 115 | 2   | 88  | 2   | 86  | 0 |
| 89  | 7   | 90  | 113 | 1   | 79  | 1   | 77  | 0 |
| 77  | 3   | 75  | 109 | 0   | 69  | 0   | 68  | 0 |
| 64  | 2   | 61  | 101 | 0   | 60  | 0   | 58  | 0 |
| 51  | 1   | 47  | 90  | 0   | 49  | 0   | 48  | 0 |
| 38  | 0   | 34  | 76  | 0   | 38  | 0   | 36  | 0 |
| 26  | 0   | 21  | 58  | 0   | 26  | 0   | 25  | 0 |
| 13  | 0   | 10  | 33  | 0   | 13  | 0   | 12  | 0 |
| 0   | 0   | 0   | 0   | 0   | 0   | 0   | 0   | 0 |

Figure 26:
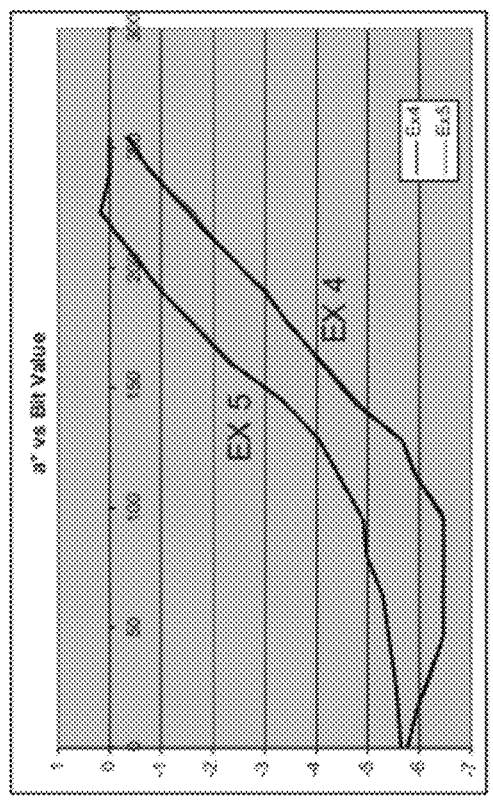
FIG. 26 shows in one example a plot of a* vs. pixel value (bit value) for both example 4 (bottom line) and example 5 (top line)
Figure 27:
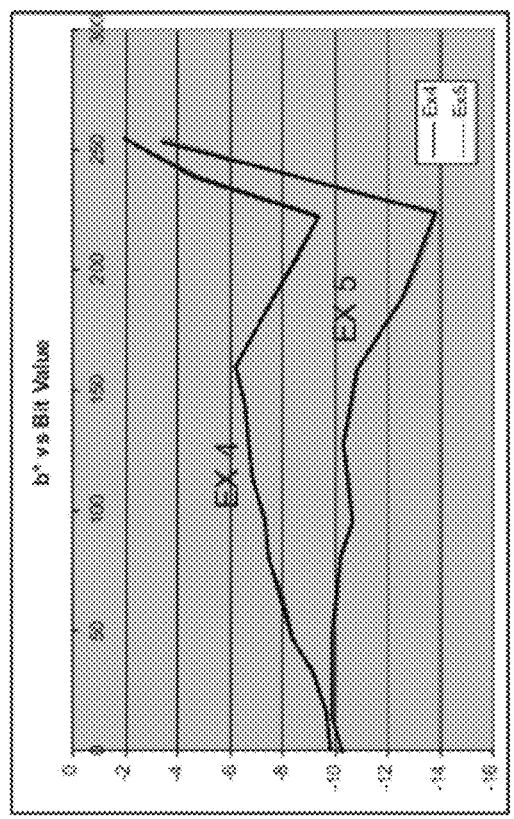
FIG. 27 shows in one example, a plot of b* vs. pixel value (bit value) for both example 4 (top line) and example 5 (bottom line).

In Examples 4 & 5 it can be seen that different combinations of ink can produce similar optical density curves but very different Tint & Tone as shown by the a* and b* plots in FIGS. 26 and 27.

Density and Densitometers

The density of an output media comprising a transparent base is defined as the common logarithm of the inverse of the transmittance (T).

The transmittance is defined as the portion of incident light impinging on one side of the film which passes through the film. Known densitometers typically comprise a light emitting subsystem with a light source for impinging light on a selected area of the film. A light detecting subsystem which can compromise a photosensitive element such as a photodiode, is positioned on the other side of the film and detects the portion of light passing through the output media.

In an example, an operator can initiate a quality check for the system 100 which might comprise causing the printer 102 to print one or more of test patches of a known value. These test patches can then be read by an internal densitometer 120 and the densitometry data 125 compared with expected optical density. This can comprise a portion of an acceptability method which comprises evaluating the how closely the printed medium reproduced the desired optical density.

In an example, the patches might be printed on the majority of the recording medium 115. In addition to allowing the evaluation of the individual recording medium 115 the accumulated data might be used to detect trends in the overall performance.

The ink-jet printer 102 might automatically print one or more test patches when a change is detected. These changes might comprise, among other things, wear within the ink-jet printer 102, information on the recording medium 114 type or batch, information regarding the inks 142, or environmental data. If the patch's densities are not acceptable there can be a variety of results comprising, among others, notification to the user that the print quality is unacceptable, notification of the need to recalibrate the system, and the like.

In an example, many ink-jet printers 102 will come with default models for transforming the data the resultant recording medium 114 will more closely resemble the desired color/tint and tone if the model is tuned to the particular set of ink(s) 142, recording medium 114 and any additional information which might affect the output image including, but not limited to environmental data such as temperature and humidity.

In an example, the pixel values 136 can correspond to a series of one or more patches of varying densities. After the pixel values 136 have been printed, the one or more patches on the recording medium 114 can be read using a densitometer 132 (reflective or transmittance as appropriate for the recording medium 114 support.) The densitometry data 132 can then be conveyed to the image processing module 104. The method of transfer can include any of the following or combinations of the following: entering the data into the inkjet printer 102 through a simple user interface, transmitting to the image processing module 104 via either a proprietary or standardized wired or wireless system, transmitting via a local area network (LAN) or a wide area network (WAN.) It can be physically transferred to the printer through the use of a physical media which can comprise a CD, DVD or flash memory. The densitometry data 134 can then be used, in conjunction with information on the corresponding Pixel Values to develop an output model to that desired.

In an example, the densitometer 132 described above can be incorporated directly into the ink jet printer 102. This creates the opportunity to more rapidly or more frequently update the densitometry data 134 and the resulting model(s) that can comprise the image processing.

In an example, the Pixel Values to print for the different patches can be stored in the ink-jet printer 102 rather than being input as pixel values 136. This may rely less on the metadata stored with the print.

In an example, the calibration process can be used at a variety of times including, but not limited to: upon the start of a new media, or media lot, upon the replenishment or replacement of ink (s), or upon user request.

Example Machine Implementation

Figure 28:
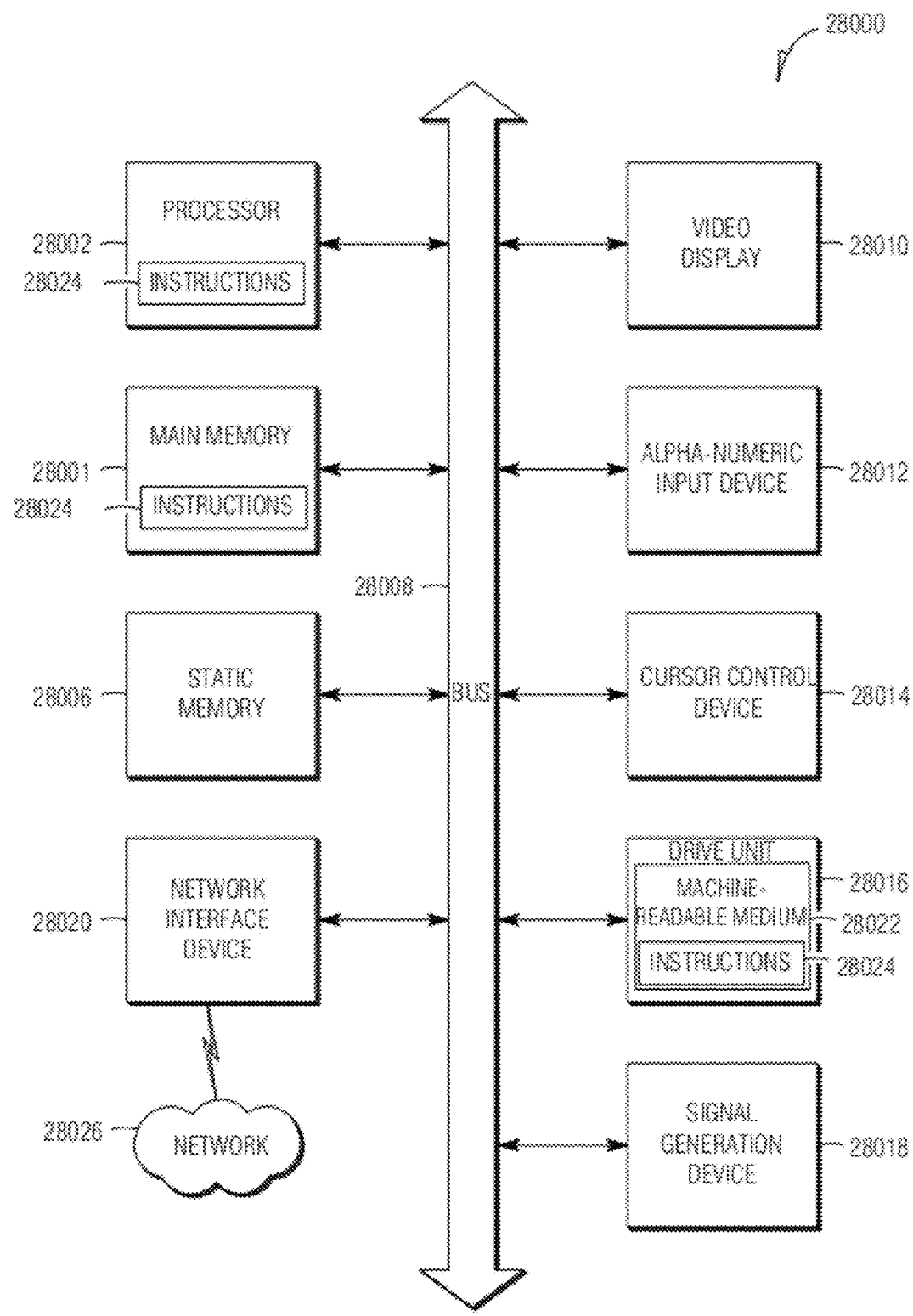
FIG. 28 shows a schematic of an example machine according to one example.

FIG. 28 shows a diagrammatic representation of a machine in the example form of a computer system 28000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 28000 includes a processor 28002 (e.g., a Central Processing Unit (CPU), a Graphics Processing Unit (GPU) or both), a main memory 28001 and a static memory 28006, which communicate with each other via a bus 28008. The computer system 28000 may further include a video display unit 28010 (e.g., a Liquid Crystal Display (LCD) or a Cathode Ray Tube (CRT)). The computer system 28000 also includes an alphanumeric input device 28012 (e.g., a keyboard), a User Interface (UI) cursor controller 28014 (e.g., a mouse), a disk drive unit 28016, a signal generation device 28018 (e.g., a speaker) and a network interface device 28020 (e.g., a transmitter).

The disk drive unit 28016 includes a machine-readable medium 28022 on which is stored one or more sets of instructions 28024 and data structures (e.g., software) embodying or used by any one or more of the methodologies or functions illustrated herein. The software may also reside, completely or at least partially, within the main memory 28001 and/or within the processor 28002 during execution thereof by the computer system 28000, the main memory 28001 and the processor 28002 also constituting machine-readable media.

The instructions 28024 may further be transmitted or received over a network 28026 via the network interface device 28020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of printing a high density image on a transparent medium comprising:
    calculating an expected optical density for an input pixel value using a first function configured to output an optical density which produces a substantially linear relationship between the input pixel value and the output optical density as substantially perceived by a human eye;
    calculating an L* value which represents a parameter in a CIELAB colorspace using the expected optical density;
    calculating a response function that describes the relationship between L* and an output pixel value, the output pixel value specifying the amount of ink to deposit onto the transparent medium;
    using the response function to solve for an output pixel value for the L* value; and
    creating a look up table based upon the input pixel value and the output pixel value, the look up table configured to be used in an inkjet printer.

2. The method of claim 1, wherein the output pixel value is for a black ink.

3. The method of claim 1, wherein the output pixel value is for cyan ink.

4. The method of claim 1, wherein the output pixel value is for magenta ink.

5. The method of claim 1, wherein the output pixel value is for yellow ink.

6. The method of claim 1, wherein the output pixel value is for light black ink.

7. The method of claim 1, wherein the output pixel value is for light cyan ink.

8. The method of claim 1, wherein the output pixel value is for light magenta ink.

9. The method of claim 1, wherein the output pixel value is for light yellow ink.

10. The method of claim 1, wherein the output pixel value is for a combined cyan, magenta, and yellow ink, and wherein the method further comprises applying a weighting function to determine a separate output pixel value for cyan, magenta and yellow ink.

11. The method of claim 10, wherein the separate output values are related in the following ratio: cyan/(cyan+magenta+yellow) is about 48%, magenta/(cyan+magenta+yellow) is about 48%, yellow/(cyan+magenta+yellow) is about 4% and (cyan+magenta+yellow)/black is about 28%.

12. The method of claim 10, wherein the separate output values are related in the following ratio: cyan/(cyan+magenta+yellow) is about 48.5%, magenta/(cyan+magenta+yellow) is about 48.5%, yellow/(cyan+magenta+yellow) is about 3% and (cyan+magenta+yellow)/black is about 37%.

13. The method of claim 10, wherein the separate output values are related in the following ratio: cyan/(cyan+magenta+yellow) is about 48.8%, magenta/(cyan+magenta+yellow) is about 48.8%, yellow/(cyan+magenta+yellow) is about 2.4% and (cyan+magenta+yellow)/black is about 51.2%.

14. A non-transitory machine readable medium that stores instructions which when performed by a machine, causes the machine to perform operations comprising:
    converting input pixel values into output ink values using a lookup table, wherein the lookup table comprises:
    input pixel value 255, black output value about 255, cyan output value about 121, magenta output value about 97 and yellow output value about 26;
    input pixel value 242, black output value about 226, cyan output value about 113, magenta output value about 92 and yellow output value about 25;
    input pixel value 230, black output value about 204, cyan output value about 107, magenta output value about 88 and yellow output value about 23;
    input pixel value 217, black output value about 184, cyan output value about 100, magenta output value about 84 and yellow output value about 22;
    input pixel value 204, black output value about 170, cyan output value about 94, magenta output value about 79 and yellow output value about 21;
    input pixel value 191, black output value about 157, cyan output value about 88, magenta output value about 75 and yellow output value about 20;
    input pixel value 179, black output value about 146, cyan output value about 82, magenta output value about 71 and yellow output value about 17;

input pixel value 166, black output value about 136, cyan output value about 77, magenta output value about 66 and yellow output value about 16;

input pixel value 153, black output value about 126, cyan output value about 71, magenta output value about 61 and yellow output value about 15;

input pixel value 140, black output value about 116, cyan output value about 65, magenta output value about 57 and yellow output value about 14;

input pixel value 128, black output value about 107, cyan output value about 59, magenta output value about 53 and yellow output value about 12;

input pixel value 115, black output value about 98, cyan output value about 53, magenta output value about 48 and yellow output value about 11;

input pixel value 102, black output value about 89, cyan output value about 48, magenta output value about 44 and yellow output value about 10;

input pixel value 89, black output value about 81, cyan output value about 42, magenta output value about 39 and yellow output value about 9;

input pixel value 77, black output value about 72, cyan output value about 36, magenta output value about 35 and yellow output value about 7;

input pixel value 64, black output value about 63, cyan output value about 31, magenta output value about 30 and yellow output value about 6;

input pixel value 51, black output value about 54, cyan output value about 25, magenta output value about 26 and yellow output value about 5;

input pixel value 38, black output value about 44, cyan output value about 19, magenta output value about 20 and yellow output value about 4;

input pixel value 26, black output value about 33, cyan output value about 13, magenta output value about 14 and yellow output value about 2;

input pixel value 13, black output value about 20, cyan output value about 7, magenta output value about 7 and yellow output value about 1; and input pixel value 0, black output value about 0, cyan output value about 0, magenta output value about 0 and yellow output value about 0.

15. A non-transitory machine readable medium that stores instructions which when performed by a machine, causes the machine to perform operations comprising:

converting input pixel values into output ink values using a lookup table, wherein the lookup table comprises:

input pixel value 255, black output value about 255, cyan output value about 152, magenta output value about 120 and yellow output value about 26;

input pixel value 242, black output value about 223, cyan output value about 142, magenta output value about 113 and yellow output value about 25;

input pixel value 230, black output value about 198, cyan output value about 133, magenta output value about 106 and yellow output value about 23;

input pixel value 217, black output value about 178, cyan output value about 124, magenta output value about 100 and yellow output value about 22;

input pixel value 204, black output value about 164, cyan output value about 116, magenta output value about 94 and yellow output value about 21;

input pixel value 191, black output value about 152, cyan output value about 107, magenta output value about 88 and yellow output value about 20;

input pixel value 179, black output value about 140, cyan output value about 100, magenta output value about 83 and yellow output value about 17;

input pixel value 166, black output value about 130, cyan output value about 92, magenta output value about 78 and yellow output value about 16;

input pixel value 153, black output value about 120, cyan output value about 85, magenta output value about 73 and yellow output value about 15;

input pixel value 140, black output value about 111, cyan output value about 78, magenta output value about 67 and yellow output value about 14;

input pixel value 128, black output value about 102, cyan output value about 71, magenta output value about 62 and yellow output value about 12;

input pixel value 115, black output value about 93, cyan output value about 64, magenta output value about 56 and yellow output value about 11;

input pixel value 102, black output value about 85, cyan output value about 57, magenta output value about 51 and yellow output value about 10;

input pixel value 89, black output value about 76, cyan output value about 50, magenta output value about 46 and yellow output value about 9;

input pixel value 77, black output value about 68, cyan output value about 43, magenta output value about 40 and yellow output value about 7;

input pixel value 64, black output value about 59, cyan output value about 36, magenta output value about 35 and yellow output value about 6;

input pixel value 51, black output value about 50, cyan output value about 30, magenta output value about 30 and yellow output value about 5;

input pixel value 38, black output value about 41, cyan output value about 23, magenta output value about 24 and yellow output value about 4;

input pixel value 26, black output value about 31, cyan output value about 16, magenta output value about 17 and yellow output value about 2;

input pixel value 13, black output value about 19, cyan output value about 8, magenta output value about 9 and yellow output value about 1; and input pixel value 0, black output value about 0, cyan output value about 0, magenta output value about 0 and yellow output value about 0.

16. A non-transitory machine readable medium that stores instructions which when performed by a machine, causes the machine to perform operations comprising:

converting input pixel values into output ink values using a lookup table, wherein the lookup table comprises:

input pixel value 255, black output value about 236, cyan output value about 192, magenta output value about 141 and yellow output value about 26;

input pixel value 242, black output value about 206, cyan output value about 173, magenta output value about 132 and yellow output value about 25;

input pixel value 230, black output value about 182, cyan output value about 157, magenta output value about 123 and yellow output value about 23;

input pixel value 217, black output value about 166, cyan output value about 145, magenta output value about 115 and yellow output value about 22;

input pixel value 204, black output value about 153, cyan output value about 134, magenta output value about 108 and yellow output value about 21;

input pixel value 191, black output value about 141, cyan output value about 125, magenta output value about 100 and yellow output value about 20;

input pixel value 179, black output value about 130, cyan output value about 115, magenta output value about 93 and yellow output value about 17;

input pixel value 166, black output value about 121, cyan output value about 105, magenta output value about 87 and yellow output value about 16;

input pixel value 153, black output value about 111, cyan output value about 96, magenta output value about 81 and yellow output value about 15;

input pixel value 140, black output value about 102, cyan output value about 88, magenta output value about 75 and yellow output value about 14;

input pixel value 128, black output value about 94, cyan output value about 81, magenta output value about 69 and yellow output value about 12;

input pixel value 115, black output value about 86, cyan output value about 73, magenta output value about 63 and yellow output value about 11;

input pixel value 102, black output value about 78, cyan output value about 65, magenta output value about 57 and yellow output value about 10;

input pixel value 89, black output value about 71, cyan output value about 57, magenta output value about 51 and yellow output value about 9;

input pixel value 77, black output value about 63, cyan output value about 49, magenta output value about 45 and yellow output value about 7;

input pixel value 64, black output value about 55, cyan output value about 41, magenta output value about 38 and yellow output value about 6;

input pixel value 51, black output value about 47, cyan output value about 33, magenta output value about 32 and yellow output value about 5;

input pixel value 38, black output value about 38, cyan output value about 26, magenta output value about 26 and yellow output value about 4;

input pixel value 26, black output value about 28, cyan output value about 18, magenta output value about 19 and yellow output value about 2;

input pixel value 13, black output value about 17, cyan output value about 9, magenta output value about 10 and yellow output value about 1; and input pixel value 0, black output value about 0, cyan output value about 0, magenta output value about 0 and yellow output value about 0.

17. A non-transitory machine readable medium that stores instructions which when performed by a machine, causes the machine to perform operations comprising:

converting input pixel values into output ink values using a lookup table, wherein the lookup table comprises:

input pixel value 255, black output value about 255, light black output value about 0, light light black output value about 0, cyan output value about 121, light cyan output value about 0, magenta output value about 97, light magenta output value about 0, and yellow output value about 26;

input pixel value 242, black output value about 223, light black output value about 22, light light black output value about 0, cyan output value about 111, light cyan output value about 9, magenta output value about 91, light magenta output value about 8, and yellow output value about 25;

input pixel value 230, black output value about 193, light black output value about 60, light light black output value about 2, cyan output value about 98, light cyan output value about 28, magenta output value about 82, light magenta output value about 27, and yellow output value about 23;

input pixel value 217, black output value about 166, light black output value about 93, light light black output value about 8, cyan output value about 84, light cyan output value about 51, magenta output value about 72, light magenta output value about 48, and yellow output value about 22;

input pixel value 204, black output value about 142, light black output value about 118, light light black output value about 20, cyan output value about 68, light cyan output value about 72, magenta output value about 60, light magenta output value about 67, and yellow output value about 21;

input pixel value 1915, black output value about 119, light black output value about 135, light light black output value about 35, cyan output value about 53, light cyan output value about 89, magenta output value about 48, light magenta output value about 83, and yellow output value about 20;

input pixel value 179, black output value about 97, light black output value about 144, light light black output value about 53, cyan output value about 39, light cyan output value about 100, magenta output value about 37, light magenta output value about 93, and yellow output value about 17;

input pixel value 166, black output value about 77, light black output value about 147, light light black output value about 70, cyan output value about 27, light cyan output value about 106, magenta output value about 27, light magenta output value about 99, and yellow output value about 16;

input pixel value 153, black output value about 59, light black output value about 145, light light black output value about 86, cyan output value about 18, light cyan output value about 108, magenta output value about 19, light magenta output value about 100, and yellow output value about 15;

input pixel value 140, black output value about 44, light black output value about 138, light light black output value about 98, cyan output value about 11, light cyan output value about 106, magenta output value about 12, light magenta output value about 99, and yellow output value about 14;

input pixel value 128, black output value about 31, light black output value about 128, light light black output value about 107, cyan output value about 6, light cyan output value about 102, magenta output value about 7, light magenta output value about 95, and yellow output value about 12;

input pixel value 115, black output value about 21, light black output value about 116, light light black output value about 112, cyan output value about 3, light cyan output value about 96, magenta output value about 4, light magenta output value about 89, and yellow output value about 11;

input pixel value 102, black output value about 13, light black output value about 103, light light black output value about 114, cyan output value about 2, light cyan output value about 88, magenta output value about 2, light magenta output value about 82, and yellow output value about 10;

input pixel value 89, black output value about 7, light black output value about 89, light light black output value about 112, cyan output value about 1, light cyan output value about 79, magenta output value about 1, light magenta output value about 74, and yellow output value about 9;

input pixel value 77, black output value about 3, light black output value about 75, light light black output value about 108, cyan output value about 0, light cyan output value about 69, magenta output value about 0, light magenta output value about 65, and yellow output value about 7;

input pixel value 64, black output value about 2, light black output value about 60, light light black output value about 100, cyan output value about 0, light cyan output value about 60, magenta output value about 0, light magenta output value about 56, and yellow output value about 6;

input pixel value 51, black output value about 1, light black output value about 46, light light black output value about 89, cyan output value about 0, light cyan output value about 49, magenta output value about 0, light magenta output value about 46, and yellow output value about 5;

input pixel value 38, black output value about 0, light black output value about 33, light light black output value about 75, cyan output value about 0, light cyan output value about 38, magenta output value about 0, light magenta output value about 35, and yellow output value about 4;

input pixel value 26, black output value about 0, light black output value about 21, light light black output value about 57, cyan output value about 0, light cyan output value about 26, magenta output value about 0, light magenta output value about 24, and yellow output value about 2;

input pixel value 13, black output value about 0, light black output value about 10, light light black output value about 33, cyan output value about 0, light cyan output value about 13, magenta output value about 0, light magenta output value about 12, and yellow output value about 1; and input pixel value 0, black output value about 0, light black output value about 0, light light black output value about 0, cyan output value about 0, light cyan output value about 0, magenta output value about 0, light magenta output value about 0, and yellow output value about 0.

18. A non-transitory machine readable medium that stores instructions which when performed by a machine, causes the machine to perform operations comprising:

converting input pixel values into output ink values using a lookup table, wherein the lookup table comprises:

input pixel value 255, black output value about 255, light black output value about 0, light light black output value about 0, cyan output value about 121, light cyan output value about 0, magenta output value about 102, light magenta output value about 0, and yellow output value about 0;

input pixel value 242, black output value about 223, light black output value about 22, light light black output value about 0, cyan output value about 111, light cyan output value about 9, magenta output value about 95, light magenta output value about 8, and yellow output value about 0;

input pixel value 230, black output value about 193, light black output value about 60, light light black output value about 2, cyan output value about 98, light cyan output value about 28, magenta output value about 86, light magenta output value about 28, and yellow output value about 0;

input pixel value 217, black output value about 166, light black output value about 93, light light black output value about 8, cyan output value about 84, light cyan output value about 51, magenta output value about 75, light magenta output value about 50, and yellow output value about 0;

input pixel value 204, black output value about 142, light black output value about 119, light light black output value about 20, cyan output value about 68, light cyan output value about 72, magenta output value about 62, light magenta output value about 70, and yellow output value about 0;

input pixel value 191, black output value about 119, light black output value about 135, light light black output value about 36, cyan output value about 53, light cyan output value about 89, magenta output value about 50, light magenta output value about 86, and yellow output value about 0;

input pixel value 179, black output value about 97, light black output value about 145, light light black output value about 53, cyan output value about 39, light cyan output value about 100, magenta output value about 38, light magenta output value about 97, and yellow output value about 0;

input pixel value 166, black output value about 77, light black output value about 148, light light black output value about 71, cyan output value about 27, light cyan output value about 106, magenta output value about 28, light magenta output value about 103, and yellow output value about 0;

input pixel value 153, black output value about 59, light black output value about 145, light light black output value about 86, cyan output value about 18, light cyan output value about 108, magenta output value about 20, light magenta output value about 105, and yellow output value about 0;

input pixel value 140, black output value about 44, light black output value about 139, light light black output value about 99, cyan output value about 11, light cyan output value about 106, magenta output value about 13, light magenta output value about 103, and yellow output value about 0;

input pixel value 128, black output value about 31, light black output value about 129, light light black output value about 108, cyan output value about 6, light cyan output value about 102, magenta output value about 7, light magenta output value about 99, and yellow output value about 0;

input pixel value 115, black output value about 21, light black output value about 117, light light black output value about 113, cyan output value about 3, light cyan output value about 96, magenta output value about 4, light magenta output value about 93, and yellow output value about 0;

input pixel value 102, black output value about 13, light black output value about 104, light light black output value about 115, cyan output value about 2, light cyan output value about 88, magenta output value about 2, light magenta output value about 86, and yellow output value about 0;

input pixel value 89, black output value about 7, light black output value about 90, light light black output value about 113, cyan output value about 1, light cyan output value about 79, magenta output value about 1, light magenta output value about 77, and yellow output value about 0;

input pixel value 77, black output value about 3, light black output value about 75, light light black output value about 109, cyan output value about 0, light cyan output value about 69, magenta output value about 0, light magenta output value about 68, and yellow output value about 0;

input pixel value 64, black output value about 2, light black output value about 61, light light black output value about 101, cyan output value about 0, light cyan output value about 60, magenta output value about 0, light magenta output value about 58, and yellow output value about 0;

input pixel value 51, black output value about 1, light black output value about 47, light light black output value about 90, cyan output value about 0, light cyan output value about 49, magenta output value about 0, light magenta output value about 48, and yellow output value about 0;

input pixel value 38, black output value about 0, light black output value about 34, light light black output value about 76, cyan output value about 0, light cyan output value about 38, magenta output value about 0, light magenta output value about 36, and yellow output value about 0;

input pixel value 26, black output value about 0, light black output value about 21, light light black output value about 58, cyan output value about 0, light cyan output value about 26, magenta output value about 0, light magenta output value about 25, and yellow output value about 0;

input pixel value 13, black output value about 0, light black output value about 10, light light black output value about 33, cyan output value about 0, light cyan output value about 13, magenta output value about 0, light magenta output value about 12, and yellow output value about 0; and input pixel value 0, black output value about 0, light black output value about 0, light light black output value about 0, cyan output value about 0, light cyan output value about 0, magenta output value about 0, light magenta output value about 0, and yellow output value about 0.

* * * * *